US012746677B2

(12) United States Patent
Yoshikawa et al.

(10) Patent No.: US 12,746,677 B2
(45) Date of Patent: Sep. 29, 2026

(54) CONTROL SYSTEM, CONTROL METHOD, AND NON-TRANSITORY STORAGE MEDIUM STORING PROGRAM

(71) Applicant: TOYOTA JIDOSHA KABUSHIKI KAISHA, Toyota (JP)

(72) Inventors: Kei Yoshikawa, Nagoya (JP); Shiro Oda, Anjo (JP); Susumu Shimizu, Tokyo (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 739 days.

(21) Appl. No.: 17/975,038

(22) Filed: Oct. 27, 2022

(65) Prior Publication Data

US 2023/0202046 A1 Jun. 29, 2023

(30) Foreign Application Priority Data

Dec. 28, 2021 (JP) ................................ 2021-214148

(51) Int. Cl.
*B25J 9/16* (2006.01)
*B25J 11/00* (2006.01)
(Continued)

(52) U.S. Cl.
CPC ......... *B25J 9/1679* (2013.01); *B25J 11/0005* (2013.01); *G06V 10/764* (2022.01);
(Continued)

(58) Field of Classification Search
CPC .... B25J 9/1679; B25J 11/0005; B25J 9/1676; B25J 13/00; B25J 9/162; G06V 10/764;
(Continued)

(56) References Cited

U.S. PATENT DOCUMENTS 12,088,907 B2 * 9/2024 Takatsuka ............ H04N 25/443
2013/0050502 A1 * 2/2013 Saito ......................... G06T 7/20
348/169
(Continued)

FOREIGN PATENT DOCUMENTS

CN 111860110 A * 10/2020 ............. G06V 10/25
CN 111738432 B * 12/2020 ............. G06N 3/045
(Continued)

OTHER PUBLICATIONS

Abughalieh, Karam & Alawneh, Shadi. (2020). Predicting Pedestrian Intention to Cross The Road. IEEE Access. pp. 1-1. 10.1109/ACCESS.2020.2987777. (Year: 2020).*
(Continued)

*Primary Examiner* — Ramon A. Mercado
*Assistant Examiner* — John Martin O'Malley
(74) *Attorney, Agent, or Firm* — Oliff PLC

(57) ABSTRACT

A control system comprises one or more processors. The one or more processors are configured to extract a feature of a person in an image captured by a camera, classify the person into a preset first group or a preset second group based on the feature, estimate a moving speed of the person belonging to the second group, and switch, based on the moving speed, a mode between a high-load mode for performing a high-load process and a low-load mode for performing a process with a load lower than a load in the high-load mode.

20 Claims, 9 Drawing Sheets

(51) Int. Cl.
*G06V 10/764* (2022.01)
*G06V 10/82* (2022.01)
*G06V 40/16* (2022.01)

(52) U.S. Cl.
CPC ............ *G06V 10/82* (2022.01); *G06V 40/168* (2022.01); *G06V 40/172* (2022.01)

(58) Field of Classification Search
CPC .... G06V 10/82; G06V 40/168; G06V 40/172; G06V 20/56; G06V 40/10; G05B 2219/40202; G05B 2219/40532; G05D 1/0223; G05D 1/0246
See application file for complete search history.

(56) References Cited

U.S. PATENT DOCUMENTS

| | | | | |
|---|---|---|---|---|
| 2014/0192206 | A1* | 7/2014 | Holz | H04N 23/651 348/169 |
| 2015/0070319 | A1* | 3/2015 | Pryor | G06F 3/0308 345/175 |
| 2016/0173752 | A1* | 6/2016 | Caviedes | H04N 1/00204 348/207.11 |
| 2018/0039745 | A1* | 2/2018 | Chevalier | G16H 50/20 |
| 2019/0019295 | A1* | 1/2019 | Lehtiniemi | H04R 5/027 |
| 2021/0157318 | A1* | 5/2021 | Takai | G05D 1/0223 |
| 2021/0309183 | A1 | 10/2021 | Bielby et al. | |
| 2021/0390291 | A1* | 12/2021 | Sameer | G06V 40/103 |
| 2022/0210317 | A1 | 6/2022 | Takatsuka et al. | |
| 2024/0192206 | A1* | 6/2024 | Chu | G01N 33/6872 |

FOREIGN PATENT DOCUMENTS

| | | | |
|---|---|---|---|
| CN | 112947402 | A | 6/2021 |
| JP | 2009252022 | A | * 10/2009 |
| JP | 2016068197 | A | * 5/2016 |
| JP | 2020-205482 | A | 12/2020 |
| JP | 2021-86199 | A | 6/2021 |
| JP | 2021-099596 | A | 7/2021 |

OTHER PUBLICATIONS

Diligent Robotics, Moxi, Reimagining the Care Team: (Year: 2025).*

T. Mekonnen, E. Harjula, T. Koskela and M. Ylianttila, "sleepyCAM: Power management mechanism for wireless video-surveillance cameras," 2017 IEEE International Conference on Communications Workshops (ICC Workshops), Paris, France, 2017, pp. 91-96, doi: 10.1109/ICCW.2017.7962639. (Year: 2017).*

Abughalieh, Karam & Alawneh, Shadi. (2020). Predicting Pedestrian Intention to Cross The Road. IEEE Access. pp. 1-1. 10.1109/ACCESS.2020.2987777. (Year: 2020) (Year: 2020).*

Diligent Robotics, Moxi, Reimagining the Care Team: (Year: 2025) (Year: 2025).*

T. Mekonnen, E. Harjula, T. Koskela and M. Ylianttila, "sleepyCAM: Power management mechanism for wireless video-surveillance cameras," 2017 IEEE International Conference on Communications Workshops (ICC Workshops), Paris, France, 2017, pp. 91-96, doi: 10.1109/ICCW.2017.7962639. (Year: 2017) (Year: 2017).*

* cited by examiner

FIG. 5

<table>
<tr><th>CATEGORY</th><th>CLOTHING COLOR</th><th>GROUP CLASSIFICATION</th><th>SPEED</th><th>MODE</th></tr>
<tr><td rowspan="2">NON-STAFF</td><td rowspan="2">UNIDENTIFIED</td><td rowspan="2">SECOND GROUP</td><td>HIGH SPEED</td><td>HIGH-LOAD MODE</td></tr>
<tr><td>LOW SPEED</td><td rowspan="4">LOW-LOAD MODE</td></tr>
<tr><td>PHARMACIST</td><td>YELLOW</td><td rowspan="3">FIRST GROUP</td><td rowspan="3">-</td></tr>
<tr><td>NURSE</td><td>PURPLE</td></tr>
<tr><td>⋮</td><td>⋮</td></tr>
</table>

FIG. 6

| | LOW-LOAD MODE | HIGH-LOAD MODE |
|---|---|---|
| CLASSIFIER | SMALL NUMBER OF LAYERS | LARGE NUMBER OF LAYERS |
| CAMERA PIXELS | SMALL NUMBER OF PIXELS | LARGE NUMBER OF PIXELS |
| FRAME RATE | LOW FRAME RATE | HIGH FRAME RATE |
| CAMERA SLEEP | ON | OFF |
| CORES USED IN GPU | SMALL NUMBER OF CORES | LARGE NUMBER OF CORES |
| UPPER LIMIT OF GPU USAGE | LOW UPPER LIMIT VALUE | HIGH UPPER LIMIT VALUE |

CONTROL SYSTEM, CONTROL METHOD, AND NON-TRANSITORY STORAGE MEDIUM STORING PROGRAM

CROSS-REFERENCE TO RELATED APPLICATION

This application claims priority to Japanese Patent Application No. 2021-214148 filed on Dec. 28, 2021, incorporated herein by reference in its entirety.

BACKGROUND

1. Technical Field

The present disclosure relates to a control system, a control method, and a non-transitory storage medium storing a program.

2. Description of Related Art

Japanese Unexamined Patent Application Publication No. 2021-86199 (JP 2021-86199 A) discloses an autonomous mobile system including a transport robot.

SUMMARY

In such a transport robot, it is desirable to transport a transport-target object more efficiently. For example, when any person is present around the transport robot, it is desirable that the transport robot move around the person. It is difficult to predict movement of a person. Therefore, there is a possibility that the transport robot cannot be controlled appropriately. For example, the transport robot needs to move at a low speed in a situation in which a person is present around the transport robot. Therefore, there is a demand to control the transport robot to move more efficiently.

The present disclosure provides a control system, a control method, and a non-transitory storage medium storing a program that are capable of performing appropriate control depending on situations.

A control system according to one aspect of the present disclosure comprises one or more processors. The one or more processors are configured to extract a feature of a person in an image captured by a camera, classify the person into a preset first group or a preset second group based on the feature, estimate a moving speed of the person belonging to the second group, and switch, based on the moving speed, a mode between a high-load mode for performing a high-load process and a low-load mode for performing a process with a load lower than a load in the high-load mode.

The one or more processors may be configured to classify the person into the first group or the second group by using a machine learning model.

The one or more processors may be configured to change network layers of the machine learning model for classification depending on the mode.

The one or more processors may be configured to switch the mode depending on a moving direction of the person belonging to the second group.

The one or more processors may be configured to change, depending on the mode, the number of pixels of the image captured by the camera, a frame rate of the camera, the number of cores used in a graphics processing unit, and an upper limit of usage of the graphics processing unit.

In the control system, in the high-load mode, a server may be configured to collect images from a plurality of the cameras and perform the process, and in the low-load mode, an edge device provided in the camera may be configured to perform the process alone.

The control system may include a mobile robot configured to move in a facility, and the one or more processors may be configured to switch control on the mobile robot depending on presence or absence of an assistant who assists movement of the person in the second group.

The one or more processors may be configured to, in a facility including a plurality of the cameras, cause some of the cameras to sleep in the low-load mode.

A control method according to one aspect of the present disclosure includes extracting a feature of a person in an image captured by a camera, classifying the person into a preset first group or a preset second group based on the feature, estimating a moving speed of the person belonging to the second group, and switching, based on the moving speed, a mode between a high-load mode for performing a high-load process and a low-load mode for performing a process with a load lower than a load in the high-load mode.

In the control method, the person may be classified into the first group or the second group by using a machine learning model.

In the control method, network layers of the machine learning model may be changed depending on the mode.

In the control method, the mode may be switched depending on a moving direction of the person belonging to the second group.

In the control method, the number of pixels of the image captured by the camera, a frame rate of the camera, the number of cores used in a graphics processing unit, and an upper limit of usage of the graphics processing unit may be changed depending on the mode.

In the control method, in the high-load mode, a server may be configured to collect images from a plurality of the cameras and perform the process, and in the low-load mode, an edge device provided in the camera may be configured to perform the process alone.

In the control method, control on a mobile robot configured to move in a facility may be switched depending on presence or absence of an assistant who assists movement of the person in the second group.

In the control method, in a facility including a plurality of the cameras, some of the cameras may be caused to sleep in the low-load mode.

A non-transitory storage medium storing a program according to one aspect of the present disclosure stores a program that causes a computer to execute a control method. The control method includes extracting a feature of a person in an image captured by a camera, classifying the person into a preset first group or a preset second group based on the feature, estimating a moving speed of the person belonging to the second group, and switching, based on the moving speed, a mode between a high-load mode for performing a high-load process and a low-load mode for performing a process with a load lower than a load in the high-load mode.

In the non-transitory storage medium storing the program, the control method may include classifying the person into the first group or the second group by using a machine learning model.

In the non-transitory storage medium storing the program, the control method may include changing network layers of the machine learning model for classification depending on the mode.

In the non-transitory storage medium storing the program, the control method may include switching the mode depending on a moving direction of the person belonging to the second group.

In the non-transitory storage medium storing the program, the control method may include changing, depending on the mode, the number of pixels of the image captured by the camera, a frame rate of the camera, the number of cores used in a graphics processing unit, and an upper limit of usage of the graphics processing unit.

In the non-transitory storage medium storing the program, the control method may include causing, in the high-load mode, a server to collect images from a plurality of the cameras and perform the process, and causing, in the low-load mode, an edge device provided in the camera to perform the process alone.

In the non-transitory storage medium storing the program, the control method may include switching control on a mobile robot configured to move in a facility depending on presence or absence of an assistant who assists movement of the person in the second group.

In the non-transitory storage medium storing the program, the control method may include causing, in a facility including a plurality of the cameras, some of the cameras to sleep in the low-load mode.

According to the present disclosure, it is possible to provide the control system, the control method, and the non-transitory storage medium storing the program that are capable of performing efficient control depending on situations.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a table illustrating an example of staff information;

FIG. 6 is a table illustrating an example of mode information;

DETAILED DESCRIPTION OF EMBODIMENTS

Hereinafter, the present disclosure will be described based on an embodiment, but the present disclosure is not limited to the following embodiment. Not all of the configurations described in the embodiment are necessarily essential as means for solving the problem.

Schematic Configuration

Figure 1:
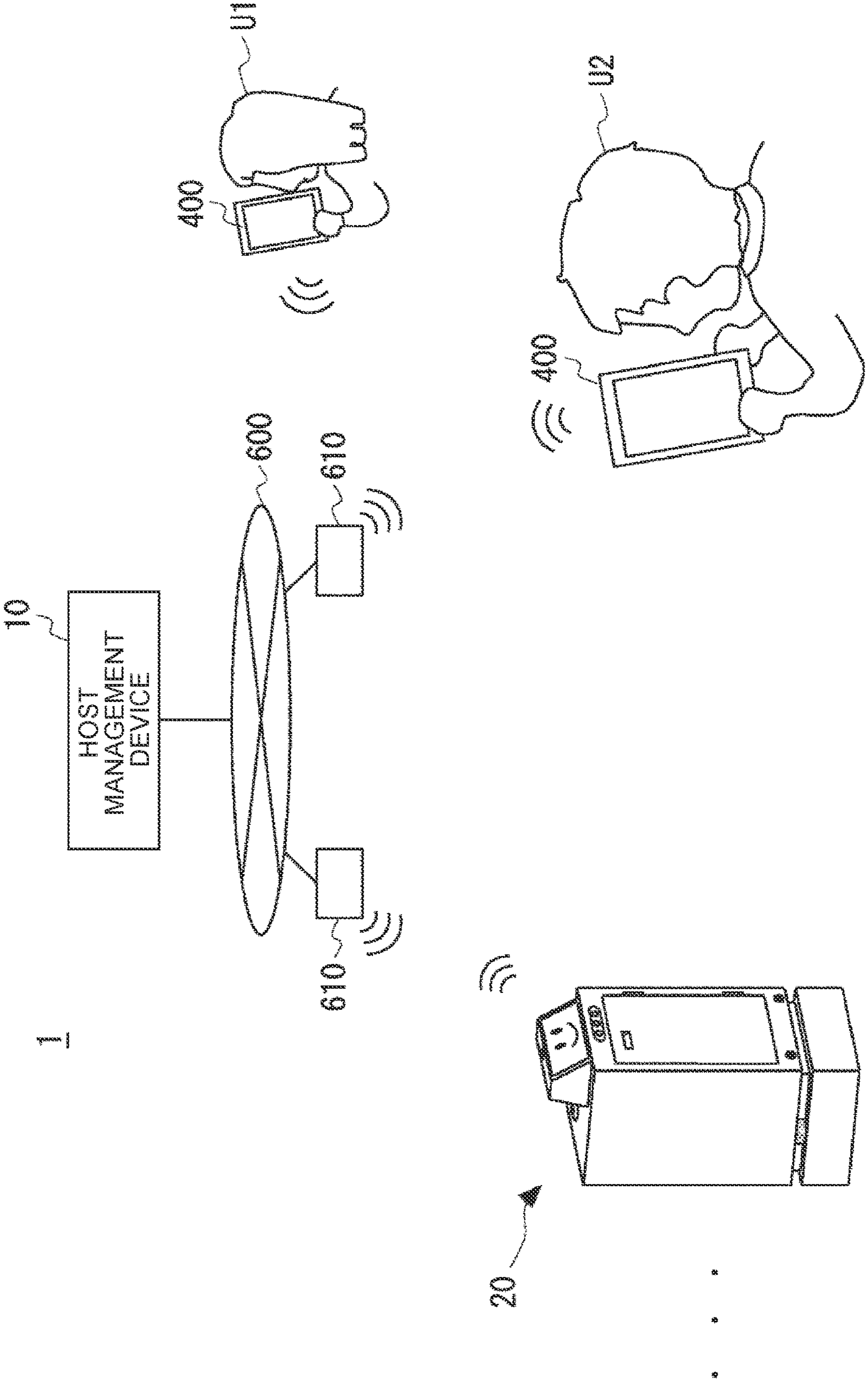
FIG. 1 is a conceptual diagram illustrating an overall configuration of a system in which a mobile robot according to an embodiment is used.

FIG. 1 is a conceptual diagram illustrating an overall configuration of a transport system 1 in which a mobile robot 20 according to the present embodiment is used. The mobile robot 20 is a transport robot that executes transport of a transport-target object as a task. The mobile robot 20 autonomously travels to transport a transport-target object in a medical welfare facility such as a hospital, a rehabilitation center, a nursing facility, or an elderly care facility. The system according to the present embodiment can also be used in a commercial facility such as a shopping mall.

A user U1 stores a transport-target object in the mobile robot 20 and requests transport. The mobile robot 20 autonomously moves to a set destination to transport the transport-target object. That is, the mobile robot 20 executes a baggage transport task (hereinafter simply referred to also as "task"). In the following description, a location where the transport-target object is loaded is referred to as "transport source", and a location where the transport-target object is delivered is referred to as "transport destination".

For example, it is assumed that the mobile robot 20 moves in a general hospital having a plurality of clinical departments. The mobile robot 20 transports equipment, consumables, medical equipment, and the like between the clinical departments. For example, the mobile robot 20 delivers a transport-target object from a nurse station of one clinical department to a nurse station of another clinical department. Alternatively, the mobile robot 20 delivers a transport-target object from a storage of equipment or medical equipment to the nurse station of the clinical department. The mobile robot 20 also delivers medicine dispensed in a dispensing department to the clinical department or a patient expected to use the medicine.

Examples of the transport-target object include medicines, consumables such as bandages, specimens, testing instruments, medical equipment, hospital food, and equipment such as stationery. Examples of the medical equipment include sphygmomanometers, blood transfusion pumps, syringe pumps, foot pumps, nurse call buttons, bed leaving sensors, low-pressure continuous inhalers, electrocardiogram monitors, drug injection controllers, enteral nutrition pumps, artificial respirators, cuff pressure gauges, touch sensors, aspirators, nebulizers, pulse oximeters, artificial resuscitators, aseptic devices, and echo machines. The mobile robot 20 may transport meals such as hospital food and inspection meals. The mobile robot 20 may transport used equipment, tableware that have been used during meals, and the like. When the transport source and the transport destination are on different floors, the mobile robot 20 may move by using an elevator or the like.

The transport system 1 includes the mobile robot 20, a host management device 10, a network 600, communication units 610, and user terminals 400. The user U1 or a user U2 can make a transport request for a transport-target object by using the user terminal 400. Examples of the user terminal 400 include a tablet computer and a smartphone. The user terminal 400 only needs to be an information processing device capable of wireless or wired communication.

In the present embodiment, the mobile robot 20 and the user terminals 400 are connected to the host management device 10 via the network 600. The mobile robot 20 and the user terminals 400 are connected to the network 600 via the communication units 610. Examples of the network 600 include a wired or wireless local area network (LAN) or wide area network (WAN). The host management device 10 is connected to the network 600 by wire or wireless. Examples of the communication unit 610 include a wireless LAN unit installed in each environment. The communication unit 610 may be a general-purpose communication device such as a WiFi router.

Various signals transmitted from the user terminals 400 of the users U1 and U2 are once sent to the host management device 10 via the network 600, and transferred from the host management device 10 to the target mobile robots 20. Similarly, various signals transmitted from the mobile robot 20 are once sent to the host management device 10 via the network 600, and transferred from the host management device 10 to the target user terminal 400. The host management device 10 is a server connected to each equipment, and collects data from each equipment. The host management device 10 is not limited to a physically single device, and may have a plurality of devices that performs distributed processing. The host management device 10 may be distributed in edge devices such as the mobile robot 20. For example, a part or all of the transport system 1 may be installed in the mobile robot 20.

The user terminal 400 and the mobile robot 20 may transmit and receive signals without the host management device 10. For example, the user terminal 400 and the mobile robot 20 may directly transmit and receive signals by wireless communication. Alternatively, the user terminal 400 and the mobile robot 20 may transmit and receive signals via the communication unit 610.

The user U1 or the user U2 requests transport of a transport-target object by using the user terminal 400. Hereinafter, description is made assuming that the user U1 is a transport requester at the transport source and the user U2 is an expected recipient at the transport destination (destination). The user U2 at the transport destination may also make a transport request. A user at a location other than the transport source or the transport destination may make a transport request.

When the user U1 makes a transport request, the user U1 inputs, by using the user terminal 400, details of a transport-target object, a receiving point of the transport-target object (hereinafter referred to also as "transport source"), a delivery destination of the transport-target object (hereinafter referred to also as "transport destination"), an estimated arrival time at the transport source (a receiving time of the transport-target object), an estimated arrival time at the transport destination (a transport deadline), and the like. Hereinafter, these pieces of information are referred to also as "transport request information". The user U1 can input the transport request information by operating a touch panel of the user terminal 400. The transport source may be a location where the user U1 is present, a storage location for the transport-target object, or the like. The transport destination is a location where the user U2 or a patient expected to use the transport-target object is present.

The user terminal 400 transmits the transport request information input by the user U1 to the host management device 10. The host management device 10 is a management system that manages a plurality of mobile robots 20. The host management device 10 transmits an operation command for executing a transport task to the mobile robot 20. The host management device 10 determines the mobile robot 20 to execute the transport task for each transport request. The host management device 10 transmits a control signal including the operation command to the mobile robot 20. The mobile robot 20 moves from the transport source to arrive at the transport destination based on the operation command.

For example, the host management device 10 assigns the transport task to the mobile robot 20 at or near the transport source. Alternatively, the host management device 10 assigns the transport task to the mobile robot 20 heading toward the transport source or its vicinity. The mobile robot 20 to which the task is assigned moves to the transport source to pick up the transport-target object. Examples of the transport source include a location where the user U1 who has requested the task is present.

When the mobile robot 20 arrives at the transport source, the user U1 or another staff member loads the transport-target object on the mobile robot 20. The mobile robot 20 loaded with the transport-target object autonomously moves with the transport destination set as the destination. The host management device 10 transmits a signal to the user terminal 400 of the user U2 at the transport destination. Thus, the user U2 can recognize that the transport-target object is being transported and recognize the estimated arrival time. When the mobile robot 20 arrives at the set transport destination, the user U2 can receive the transport-target object stored in the mobile robot 20. In this way, the mobile robot 20 executes the transport task.

In the overall configuration described above, each element of the control system can be distributed to the mobile robot 20, the user terminal 400, and the host management device 10 to construct the control system as a whole. It is also possible to collect substantial elements for achieving the transport of the transport-target object in a single device to construct the system. The host management device 10 controls one or more mobile robots 20.

In the present embodiment, the mobile robot 20 autonomously moves by referring to a map. The robot control system that controls the mobile robot 20 acquires distance information indicating a distance to a person that is measured by using a distance measuring sensor. The robot control system estimates a movement vector indicating a moving speed and a moving direction of the person based on a change in the distance to the person. The robot control system imparts a cost on the map to limit the movement of the mobile robot. The robot control system controls the mobile robot 20 to move depending on the cost updated based on the measurement result of the distance measuring sensor. The robot control system may be installed in the mobile robot 20, and a part or all of the robot control system may be installed in the host management device 10.

Facility users include staff members working at the facility and other non-staff persons. When the facility is a hospital, the non-staff persons include patients, inpatients, visitors, outpatients, attendants, and the like. The staff members include doctors, nurses, pharmacists, clerks, occupational therapists, and various employees. The staff members may include persons who carry in various articles, maintenance companies, a cleaning staff, and the like. The staff members are not limited to direct employers and employees of the hospital, but may include related employees.

The mobile robot 20 moves in an environment including the hospital staff members and the non-staff persons mixed together so as not to come into contact with these persons. Specifically, the mobile robot 20 may move at a speed at which the mobile robot 20 does not come into contact with the surrounding persons. The mobile robot 20 may further slow down or stop when any object is present at a distance shorter than a preset distance. The mobile robot 20 can take an action of autonomously moving around an object or output voice or light for notifying the surroundings about the presence of the mobile robot 20.

To appropriately control the mobile robot 20, the host management device 10 needs to appropriately monitor the facility depending on situations in the facility. Specifically, the host management device 10 switches modes depending on whether the user is the staff member. Since the staff member is accustomed to the environment including the mobile robot 20, the staff member rarely performs an action that interferes with the task of the mobile robot 20. Since the non-staff person is not accustomed to the environment including the mobile robot 20, the non-staff person may perform an action that interferes with the task of the mobile robot.

For example, the non-staff person may run across an area ahead of the mobile robot 20 in its moving direction. In a situation in which the non-staff person is moving at a speed higher than a certain threshold speed, the area around the non-staff person needs to be monitored more closely. In a situation in which the non-staff person is moving at a speed lower than the certain threshold speed, there is no need to closely monitor the area around the non-staff person. Similarly, in a situation without the non-staff persons, that is, in a situation with only the staff members or with no person, there is no need to closely monitor the surrounding area.

In the present embodiment, the host management device 10 determines whether the user imaged by a camera is the non-staff person. More specifically, the host management device 10 classifies the users into a first group to which preset staff members belong and a second group including persons other than the staff members. The host management device 10 determines whether the user imaged by the camera belongs to the first group.

When there is a user belonging to the second group, the host management device 10 determines a moving speed of the user. Then, the host management device 10 switches the mode based on the moving speed of the person belonging to the second group. When the moving speed of the person belonging to the second group is higher than the threshold speed, the processing load for monitoring is increased. In other words, in an area where the non-staff person is moving at a high speed, the host management device 10 performs a process in a high-load mode (second mode) with a high processing load. In an area where the non-staff person is moving at a low speed, the host management device 10 performs a process in a low-load mode (first mode) with a low processing load.

When the monitoring target area includes only users matching the persons belonging to the first group, the host management device 10 reduces the processing load for monitoring. In the situation without the non-staff persons, the host management device 10 performs a process in the low-load mode (first mode) with a low processing load. As a result, the control can appropriately be performed depending on the usage status of the facility. That is, when the non-staff person is moving at a high speed, the monitoring is performed more closely to reduce influence on the task of the mobile robot 20. As a result, the transport task can be executed efficiently.

Control Block Diagram

Figure 2:
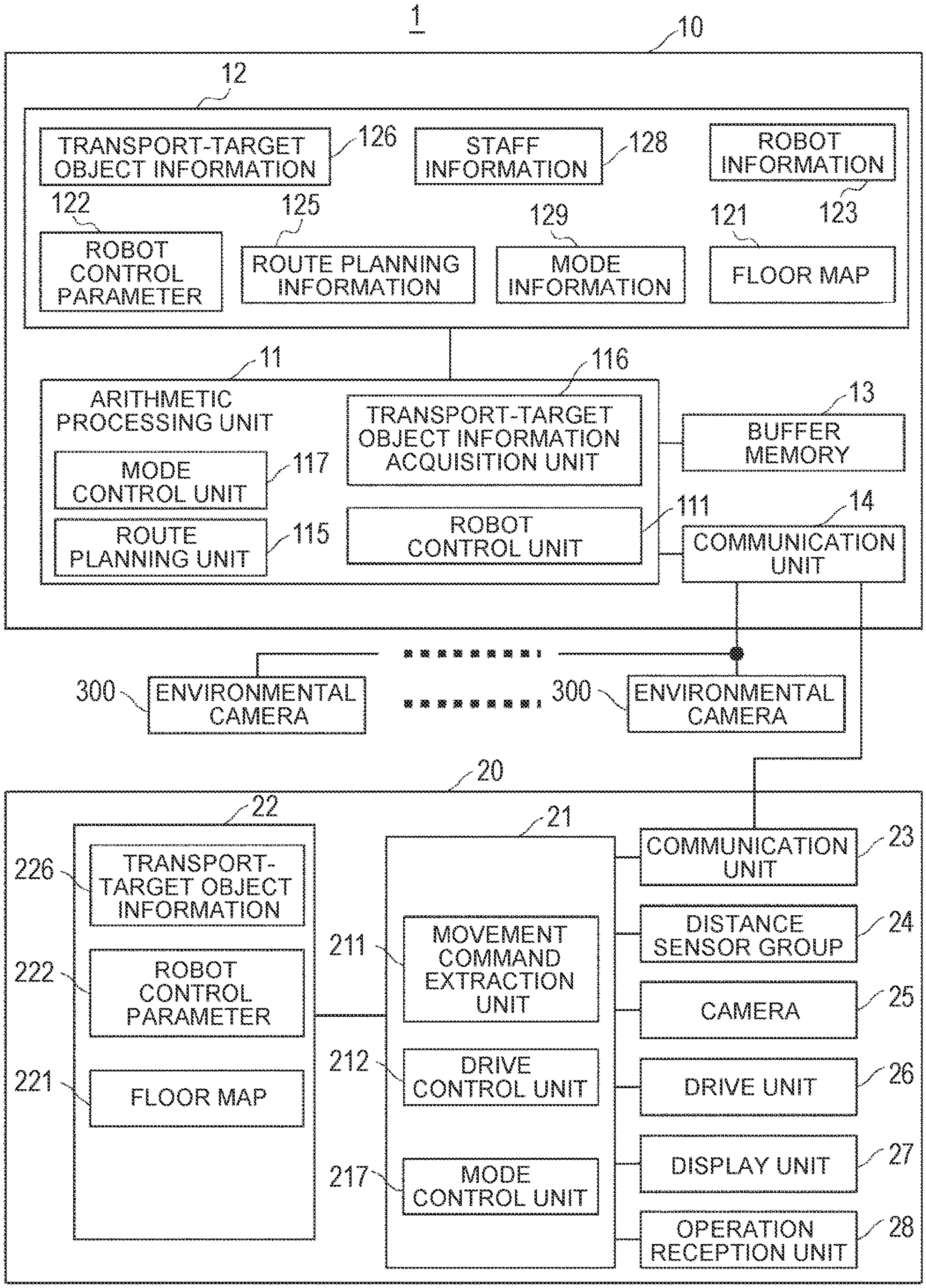
FIG. 2 is a control block diagram of a control system according to the embodiment.

FIG. 2 is a control block diagram showing a control system of the system 1. As shown in FIG. 2, the system 1 includes the host management device 10, the mobile robot 20, and environmental cameras 300.

The system 1 efficiently controls a plurality of mobile robots 20 while causing the mobile robots 20 to autonomously move in a predetermined facility. Therefore, a plurality of environmental cameras 300 is installed in the facility. For example, the environmental cameras 300 are each installed in a passage, a hallway, an elevator, an entrance/exit, etc. in the facility.

The environmental cameras 300 acquire images of ranges in which the mobile robot 20 moves. In the system 1, the host management device 10 collects the images acquired by the environmental cameras 300 and the information based on the images. Alternatively, the images or the like acquired by the environmental cameras 300 may directly be transmitted to the mobile robots. The environmental cameras 300 may be surveillance cameras or the like provided in a passage or an entrance/exit in the facility. The environmental cameras 300 may be used to determine the distribution of congestion status in the facility.

In the system 1 according to the embodiment, the host management device 10 performs route planning based on the transport request information. The host management device 10 instructs each mobile robot 20 about a destination based on generated route planning information. Then, the mobile robot 20 autonomously moves toward the destination designated by the host management device 10. The mobile robot 20 autonomously moves toward the destination by using sensors provided in the mobile robot 20, floor maps, position information, and the like.

For example, the mobile robot 20 travels so as not to come into contact with surrounding equipment, objects, walls, and persons (hereinafter collectively referred to as "peripheral objects"). Specifically, the mobile robot 20 detects a distance from the peripheral object and travels while keeping a predetermined distance (defined as "distance threshold value") or longer from the peripheral object. When the distance from the peripheral object is equal to or shorter than the distance threshold value, the mobile robot 20 decelerates or stops. In this way, the mobile robot 20 can travel without coming into contact with the peripheral objects. Since contact can be avoided, safe and efficient transport is possible.

The host management device 10 includes an arithmetic processing unit 11, a storage unit 12, a buffer memory 13, and a communication unit 14. The arithmetic processing unit 11 performs arithmetic operations for controlling and managing the mobile robot 20. The arithmetic processing unit 11 can be implemented as a device capable of executing a program, such as a central processing unit (CPU) of a computer. Various functions can also be implemented by a program. FIG. 2 shows only a robot control unit 111, a route planning unit 115, and a transport-target object information acquisition unit 116 that are features of the arithmetic processing unit 11, but other processing blocks can also be provided.

The robot control unit 111 performs an arithmetic operation for remotely controlling the mobile robot 20 and generates a control signal. The robot control unit 111 generates the control signal based on, for example, route planning information 125 described later. The robot control unit 111 generates the control signal based on various types of information acquired from the environmental cameras 300 and the mobile robots 20. The control signal may include update information of, for example, a floor map 121, robot information 123, and a robot control parameter 122 described later. That is, when various types of information are updated, the robot control unit 111 generates control signals based on these pieces of updated information.

The transport-target object information acquisition unit 116 acquires information on a transport-target object. The transport-target object information acquisition unit 116 acquires information on details (type) of a transport-target object currently transported by the mobile robot 20. The transport-target object information acquisition unit 116 acquires transport-target object information on a transport-target object currently transported by the mobile robot 20 having an error.

The route planning unit 115 performs route planning for each mobile robot 20. When a transport task is input, the route planning unit 115 performs route planning for transporting a transport-target object to a transport destination (destination) based on transport request information. Specifically, the route planning unit 115 determines the mobile robot 20 to execute the new transport task with reference to the route planning information 125, the robot information 123, and the like already stored in the storage unit 12. The starting point is a current position of the mobile robot 20, a transport destination of an immediately preceding transport task, a receiving point of the transport-target object, or the like. The destination is the transport destination of the transport-target object, a standby location, a charging location, or the like.

The route planning unit 115 sets passing points from the starting point to the destination of the mobile robot 20. The route planning unit 115 sets the passing order of the passing points for each mobile robot 20. The passing points are set, for example, at branch points, intersections, lobbies in front of elevators, and their surroundings. In a narrow passage, it may be difficult for the mobile robots 20 to pass each other. In such a case, the passing point may be set at a location before the narrow passage. Candidates for the passing points may be preregistered in the floor map 121.

The route planning unit 115 determines the mobile robots 20 to execute the transport tasks from among the plurality of mobile robots 20 to execute the tasks efficiently as the entire system. The route planning unit 115 assigns the transport task to the mobile robot 20 on standby or the mobile robot 20 close to the transport source with priority.

The route planning unit 115 sets passing points including a starting point and a destination for the mobile robot 20 to which the transport task is assigned. For example, when there are two or more movement routes from the transport source to the transport destination, the passing points are set such that the movement can be performed in a shorter period. Thus, the host management device 10 updates information indicating the congestion status of passages based on images captured by the cameras or the like. Specifically, locations where other mobile robots 20 are passing and locations with many persons have high degrees of congestion. Therefore, the route planning unit 115 sets the passing points to avoid locations with the high degrees of congestion.

The mobile robot 20 may be able to move to the destination by either a counterclockwise movement route or a clockwise movement route. In such a case, the route planning unit 115 sets the passing points to pass through the less congested movement route. The route planning unit 115 sets one or more passing points to the destination, whereby the mobile robot 20 can move along a movement route that is not congested. For example, when a passage branches at a branch point or an intersection, the route planning unit 115 sets a passing point at the branch point, the intersection, the corner, or the surroundings as appropriate. Thus, the transport efficiency can be improved.

The route planning unit 115 may set the passing points in consideration of the congestion status of an elevator, a moving distance, and the like. The host management device 10 may estimate the number of mobile robots 20 and the number of persons at an estimated time when the mobile robot 20 passes through a certain location. Then, the route planning unit 115 may set the passing points based on the estimated congestion status. The route planning unit 115 may dynamically change the passing points depending on a change in the congestion status. The route planning unit 115 sequentially sets the passing points for the mobile robot 20 to which the transport task is assigned. The passing points may include the transport source and the transport destination. As described later, the mobile robot 20 autonomously moves to sequentially pass through the passing points set by the route planning unit 115.

A mode control unit 117 performs control for switching the modes depending on situations in the facility. For example, the mode control unit 117 switches the low-load mode and the high-load mode depending on situations. In the low-load mode, the processing load of the processor or the like is low. In the high-load mode, the processing load of the processor or the like is high. In the high-load mode, the processing load of the processor or the like is higher than that in the low-load mode. By switching the modes depending on the situations in the facility, the processing load can be reduced and the power consumption can be reduced. The control of the mode control unit 117 will be described later.

The storage unit 12 stores information necessary for managing and controlling the robots. In the example of FIG. 2, the floor map 121, the robot information 123, the robot control parameter 122, the route planning information 125, transport-target object information 126, staff information 128, and mode information 129 are shown, but the information stored in the storage unit 12 may include other information. The arithmetic processing unit 11 performs arithmetic operations by using the information stored in the storage unit 12 when performing various processes. Various types of information stored in the storage unit 12 can be updated to the latest information.

The floor map 121 is map information of the facility in which the mobile robot 20 moves. The floor map 121 may be created in advance or may be generated from information acquired from the mobile robot 20. The floor map 121 may be obtained by adding, to a basic map created in advance, map correction information generated from the information acquired from the mobile robot 20.

For example, the floor map 121 stores positions of and information on, for example, walls, gates, doors, stairs, elevators, and fixed shelfs in the facility. The floor map 121 may be represented as a two-dimensional grid map. In this case, the floor map 121 includes the information on the walls, the doors, and the like assigned to each grid.

The robot information 123 indicates IDs, model numbers, specifications, and the like of the mobile robots 20 managed by the host management device 10. The robot information 123 may include position information indicating current positions of the mobile robots 20. The robot information 123 may include information on whether the mobile robots 20 are executing tasks or on standby. The robot information 123 may also include information indicating, for example, whether the mobile robots 20 are operating or have troubles. The robot information 123 may also include information on transport-target objects that can be transported and transport-target objects that cannot be transported.

The robot control parameter 122 indicates control parameters such as a threshold distance from a peripheral object for each mobile robot 20 managed by the host management device 10. The threshold distance is a margin distance for avoiding contact with the peripheral objects including a person. The robot control parameter 122 may include information on an operating intensity such as a speed upper limit value of the moving speed of the mobile robot 20.

The robot control parameter 122 may be updated depending on situations. The robot control parameter 122 may include information indicating an availability and a usage status of a storage space of a storage 291. The robot control parameter 122 may include information on transport-target objects that can be transported and transport-target objects that cannot be transported. The above-described various types of information in the robot control parameter 122 are associated with each mobile robot 20.

The route planning information 125 includes route planning information planned by the route planning unit 115. The route planning information 125 includes, for example, information indicating a transport task. The route planning information 125 may include, for example, information on an ID of the mobile robot 20 to which the task is assigned, a starting point, details of a transport-target object, a transport destination, a transport source, an estimated arrival time at the transport destination, an estimated arrival time at the transport source, and an arrival deadline. In the route planning information 125, the various types of information described above may be associated with each transport task. The route planning information 125 may include at least a part of the transport request information input from the user U1.

The route planning information 125 may include information on the passing points for each mobile robot 20 and each transport task. For example, the route planning information 125 includes information indicating the passing order of the passing points for each mobile robot 20. The route planning information 125 may include coordinates of each passing point on the floor map 121 and information on whether the mobile robot 20 has passed through the passing points.

The transport-target object information 126 is information on a transport-target object for which a transport request has been made. For example, the transport-target object information 126 includes information on details (type) of the transport-target object, a transport source, and a transport destination. The transport-target object information 126 may include an ID of the mobile robot 20 in charge of the transport. The transport-target object information may include information indicating a status such as transport under way, pre-transport (before loading), or post-transport. These types of information in the transport-target object information 126 are associated with each transport-target object. The transport-target object information 126 will be described later.

The staff information 128 is information for classification as to whether the user in the facility is a staff member. That is, the staff information 128 includes information for classifying a person included in image data into the first group or the second group. For example, the staff information 128 includes information on preregistered staff members. The mode information 129 includes information for controlling each mode from a classification result. Details of the staff information 128 and the mode information 129 will be described later.

The route planning unit 115 refers to various types of information stored in the storage unit 12 to create a route plan. For example, the route planning unit 115 determines the mobile robot 20 to execute a task based on the floor map 121, the robot information 123, the robot control parameter 122, and the route planning information 125. Then, the route planning unit 115 refers to the floor map 121 and the like to set passing points to a transport destination and the passing order thereof. Candidates for the passing points are preregistered in the floor map 121. The route planning unit 115 sets the passing points based on the congestion status and the like. In the case of continuous processing of tasks, the route planning unit 115 may set the transport source and the transport destination as the passing points.

Two or more mobile robots 20 may be assigned to one transport task. For example, when the transport-target object is larger than the transportable volume of the mobile robot 20, one transport-target object is divided into two and loaded on the two mobile robots 20. Alternatively, when the transport-target object is heavier than the transportable weight of the mobile robot 20, one transport-target object is divided into two and loaded on the two mobile robots 20. In this way, one transport task can be shared and executed by two or more mobile robots 20. When the mobile robots 20 of different sizes are controlled, route planning may be performed such that the mobile robot 20 capable of transporting the transport-target object receives the transport-target object.

Further, one mobile robot 20 may perform two or more transport tasks in parallel. For example, one mobile robot 20 may simultaneously load two or more transport-target objects and sequentially transport the transport-target objects to different transport destinations. Alternatively, while one mobile robot 20 is transporting one transport-target object, another transport-target object may be loaded on the mobile robot 20. The transport destinations of the transport-target objects loaded at different locations may be the same or different. With this configuration, the tasks can be executed efficiently.

In such a case, storage information indicating the usage status or availability of the storage space of the mobile robot 20 may be updated. That is, the host management device 10 may manage the storage information indicating the availability and control the mobile robot 20. For example, the storage information is updated when the transport-target object is loaded or received. When the transport task is input, the host management device 10 refers to the storage information and directs the mobile robot 20 having room for loading the transport-target object to receive the transport-target object. With this configuration, one mobile robot 20 can execute a plurality of transport tasks at the same time, and two or more mobile robots 20 can share and execute a transport task. For example, a sensor may be installed in the storage space of the mobile robot 20 to detect the availability. The volume and weight of each transport-target object may be preregistered.

The buffer memory 13 accumulates intermediate information generated in the process performed by the arithmetic processing unit 11. The communication unit 14 is a communication interface for communicating with the environmental cameras 300 provided in the facility where the system 1 is used and at least one mobile robot 20 provided in the facility where the system 1 is used. The communication unit 14 can perform both wired communication and wireless communication. For example, the communication unit 14 transmits, to each mobile robot 20, a control signal necessary for controlling the mobile robot 20. The communication unit 14 receives information collected by the mobile robot 20 and the environmental cameras 300.

The mobile robot 20 includes an arithmetic processing unit 21, a storage unit 22, a communication unit 23, a proximity sensor (for example, a distance sensor group 24), a camera 25, a drive unit 26, a display unit 27, and an operation reception unit 28. Although FIG. 2 shows only typical processing blocks provided in the mobile robot 20, the mobile robot 20 also includes many other processing blocks that are not shown.

The communication unit 23 is a communication interface for communicating with the communication unit 14 of the host management device 10. The communication unit 23 communicates with the communication unit 14 by using, for example, a radio signal. The distance sensor group 24 is, for example, a proximity sensor, and outputs proximity object distance information indicating a distance from an object or a person around the mobile robot 20. The distance sensor group 24 includes a distance measuring sensor such as a light detection and ranging (LiDAR) sensor. By manipulating the emission direction of an optical signal, the distance to the peripheral object can be measured. The peripheral object may also be recognized from point cloud data detected by the distance measuring sensor or the like. For example, the camera 25 captures an image for grasping a surrounding situation of the mobile robot 20. The camera 25 can also capture an image of a position marker provided on, for example, the ceiling in the facility. The mobile robot 20 may grasp the position of the mobile robot 20 by using this position marker.

The drive unit 26 drives drive wheels provided on the mobile robot 20. The drive unit 26 may include an encoder or the like that detects the number of rotations of the drive wheels and a drive motor thereof. The position of the mobile robot 20 (current position) may be estimated based on an output of the encoder. The mobile robot 20 detects its current position and transmits information to the host management device 10. The mobile robot 20 estimates its position on the floor map 121 by odometry or the like.

The display unit 27 and the operation reception unit 28 are implemented by a touch panel display. The display unit 27 displays a user interface screen that serves as the operation reception unit 28. The display unit 27 may display information indicating a destination of the mobile robot 20 and a state of the mobile robot 20. The operation reception unit 28 receives an operation from the user. The operation reception unit 28 includes various switches provided on the mobile robot 20 in addition to the user interface screen displayed on the display unit 27.

The arithmetic processing unit 21 performs arithmetic operations to be used for controlling the mobile robot 20. The arithmetic processing unit 21 can be implemented as a device capable of executing a program, such as a central processing unit (CPU) of a computer. Various functions can also be implemented by a program. The arithmetic processing unit 21 includes a movement command extraction unit 211, a drive control unit 212, and a mode control unit 217. Although FIG. 2 shows only typical processing blocks provided in the arithmetic processing unit 21, the arithmetic processing unit 21 also includes processing blocks that are not shown. The arithmetic processing unit 21 may search for a route between passing points.

The movement command extraction unit 211 extracts a movement command from a control signal given by the host management device 10. For example, the movement command includes information on the next passing point. For example, the control signal may include information on coordinates of the passing points and the passing order of the passing points. The movement command extraction unit 211 extracts these pieces of information as the movement command.

The movement command may include information indicating that the movement to the next passing point has become possible. When the passage width is narrow, there is a possibility that the mobile robots 20 cannot pass each other. There is also a possibility that the passage cannot be used temporarily. In those cases, the control signal includes a command to stop the mobile robot 20 at a passing point before the location where the mobile robot 20 should stop. After the other mobile robot 20 has passed or after movement in the passage has become possible, the host management device 10 outputs a control signal informing the mobile robot 20 that the mobile robot 20 can move in the passage. Thus, the mobile robot 20 that has temporarily been stopped resumes movement.

The drive control unit 212 controls the drive unit 26 such that the drive unit 26 moves the mobile robot 20 based on the movement command given from the movement command extraction unit 211. For example, the drive unit 26 includes drive wheels that rotate based on a control command value from the drive control unit 212. The movement command extraction unit 211 extracts the movement command such that the mobile robot 20 moves toward the passing point received from the host management device 10. The drive unit 26 rotationally drives the drive wheels. The mobile robot 20 autonomously moves toward the next passing point. With this configuration, the mobile robot 20 sequentially passes through the passing points to arrive at the transport destination. The mobile robot 20 may estimate its position and transmit, to the host management device 10, a signal indicating that the mobile robot 20 has passed through the passing point. Thus, the host management device 10 can manage the current position and the transport status of each mobile robot 20.

The mode control unit 217 performs control for switching the modes depending on situations. The mode control unit 217 may perform the same process as that of the mode control unit 117. The mode control unit 217 may perform a part of the process of the mode control unit 117 of the host management device 10. That is, the mode control unit 117 and the mode control unit 217 may cooperate to perform the process for controlling the modes. The mode control unit 217 may perform the process independently of the mode control unit 117. The mode control unit 217 performs a process whose processing load is lower than the processing load of the mode control unit 117.

The storage unit 22 stores a floor map 221, a robot control parameter 222, and transport-target object information 226. FIG. 2 shows only a part of the information stored in the storage unit 22, and the information also includes information other than the floor map 221, the robot control parameter 222, and the transport-target object information 226 shown in FIG. 2. The floor map 221 is map information of the facility in which the mobile robot 20 moves. This floor map 221 is, for example, a download of the floor map 121 of the host management device 10. The floor map 221 may be created in advance. The floor map 221 need not be map information of the entire facility but may be map information including a part of an area in which the mobile robot 20 is scheduled to move.

The robot control parameter 222 is a parameter for operating the mobile robot 20. The robot control parameter 222 includes, for example, a distance threshold value from a peripheral object. The robot control parameter 222 also includes a speed upper limit value of the mobile robot 20.

Similarly to the transport-target object information 126, the transport-target object information 226 includes information on a transport-target object. The transport-target object information 226 includes information on details (type) of the transport-target object, a transport source, and a transport destination. The transport-target object information 226 may include information indicating a status such as transport under way, pre-transport (before loading), and post-transport. These types of information in the transport-target object information 226 are associated with each transport-target object. The transport-target object information 226 will be described later. The transport-target object information 226 only needs to include information on a transport-target object to be transported by the mobile robot 20. Therefore, the transport-target object information 226 is a part of the transport-target object information 126. That is, the transport-target object information 226 need not include the information on the transport to be performed by other mobile robots 20.

The drive control unit 212 refers to the robot control parameter 222 and stops or decelerates the operation in response to the fact that the distance indicated by distance information acquired from the distance sensor group 24 has fallen below the distance threshold value. The drive control unit 212 controls the drive unit 26 such that the mobile robot 20 travels at a speed equal to or lower than the speed upper limit value. The drive control unit 212 limits the rotation speed of the drive wheels such that the mobile robot 20 does not move at a speed equal to or higher than the speed upper limit value.

Structure of Mobile Robot 20

Figure 3:
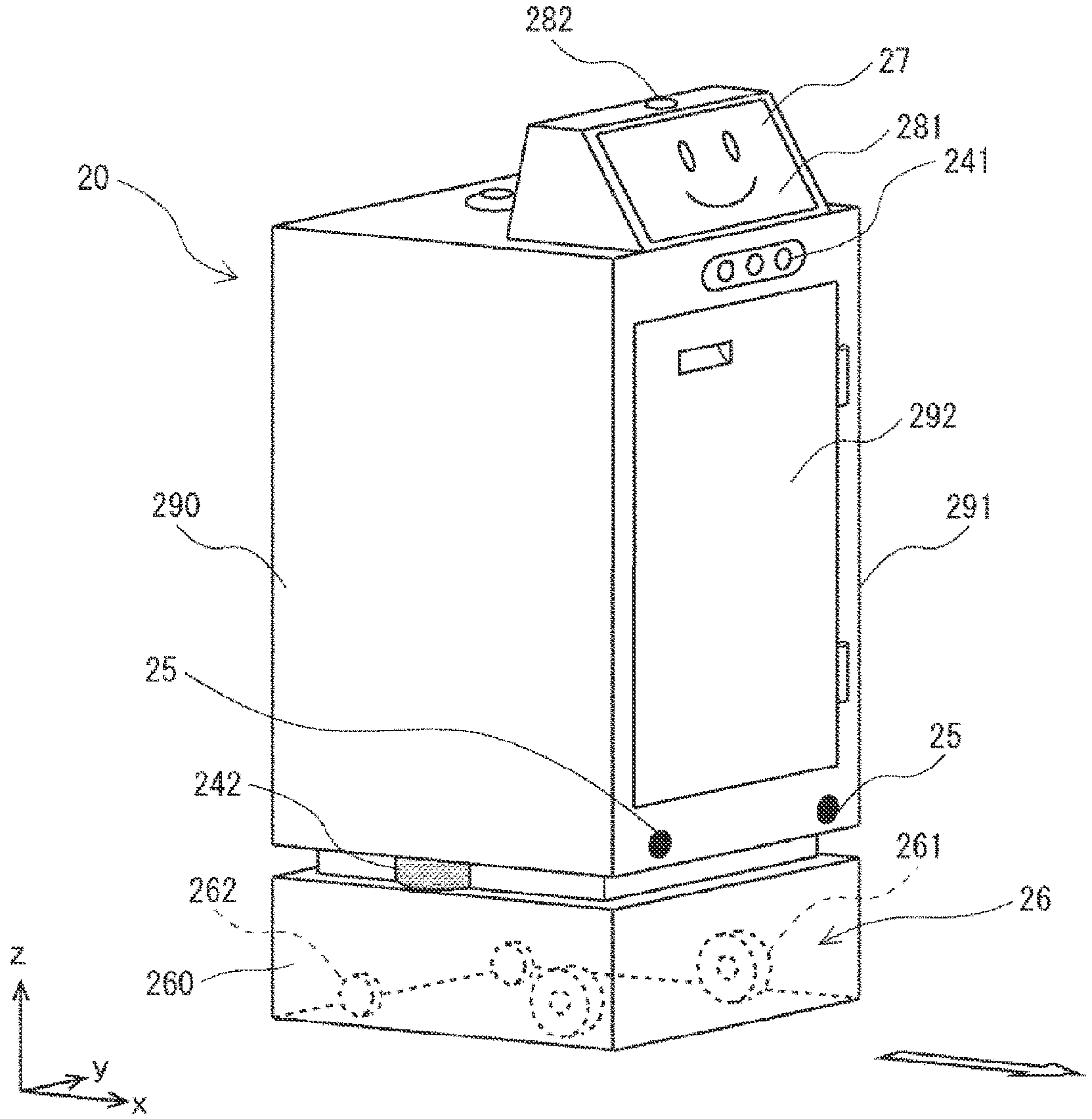
FIG. 3 is a schematic diagram showing an example of the mobile robot.

The appearance of the mobile robot 20 will be described. FIG. 3 is a schematic diagram of the mobile robot 20. The mobile robot 20 shown in FIG. 3 is one form of the mobile robot 20, and may be in another form. In FIG. 3, the x direction is forward and backward directions of the mobile robot 20, the y direction is a right-left direction of the mobile robot 20, and the z direction is a height direction of the mobile robot 20.

The mobile robot 20 includes a main body portion 290 and a carriage portion 260. The main body portion 290 is installed on the carriage portion 260. The main body portion 290 and the carriage portion 260 each have a rectangular parallelepiped housing, and each component is installed inside the housing. For example, the drive unit 26 is housed inside the carriage portion 260.

The main body portion 290 is provided with the storage 291 that serves as a storage space and a door 292 that seals the storage 291. The storage 291 is provided with a plurality of shelves, and the availability is managed for each shelf. For example, the availability can be updated by providing various sensors such as a weight sensor in each shelf. The mobile robot 20 moves autonomously to transport a transport-target object stored in the storage 291 to a destination under instruction from the host management device 10. The main body portion 290 may include a control box or the like (not shown) in the housing. The door 292 may be locked with an electronic key or the like. Upon arriving at the transport destination, the user U2 unlocks the door 292 with the electronic key. Alternatively, the door 292 may automatically be unlocked when the mobile robot 20 arrives at the transport destination.

As shown in FIG. 3, front-rear distance sensors 241 and right-left distance sensors 242 are provided as the distance sensor group 24 on the exterior of the mobile robot 20. The mobile robot 20 measures distances of peripheral objects in the front-rear direction of the mobile robot 20 by the front-rear distance sensors 241. The mobile robot 20 measures distances of peripheral objects in the right-left direction of the mobile robot 20 by the right-left distance sensors 242.

For example, the front-rear distance sensors 241 are provided on the front surface and the rear surface of the housing of the main body portion 290. The right-left distance sensors 242 are provided on the right side surface and the left side surface of the housing of the main body portion 290. The front-rear distance sensors 241 and the right-left distance sensors 242 are, for example, ultrasonic distance sensors or laser rangefinders. The front-rear distance sensors 241 and the right-left distance sensors 242 detect the distances from the peripheral objects. When the distance from the peripheral object that is detected by the front-rear distance sensor 241 or the right-left distance sensor 242 is equal to or shorter than the distance threshold value, the mobile robot 20 decelerates or stops.

The drive unit 26 is provided with drive wheels 261 and casters 262. The drive wheels 261 are wheels for moving the mobile robot 20 frontward, rearward, rightward, and leftward. The casters 262 are driven wheels that roll following the drive wheels 261 without being given a driving force. The drive unit 26 includes a drive motor (not shown) and drives the drive wheels 261.

For example, the drive unit 26 supports, in the housing, two drive wheels 261 and two casters 262 in contact with a traveling surface. The two drive wheels 261 are arranged such that their rotation axes coincide with each other. The drive wheels 261 are independently rotationally driven by the motor (not shown). The drive wheels 261 rotate based on a control command value from the drive control unit 212 in FIG. 2. The casters 262 are driven wheels that are provided such that pivot shafts extending in the vertical direction from the drive unit 26 pivotally support the wheels at positions away from the rotation shafts of the wheels, thereby following the moving direction of the drive unit 26.

For example, when the two drive wheels 261 are rotated in the same direction at the same rotation speed, the mobile robot 20 travels straight, and when the two drive wheels 261 are rotated in opposite directions at the same rotation speed, the mobile robot 20 pivots around a vertical axis extending through the substantial center between the two drive wheels 261. By rotating the two drive wheels 261 in the same direction at different rotation speeds, the mobile robot 20 can travel while turning right or left. For example, the mobile robot 20 can make a right turn by making the rotation speed of the left drive wheel 261 higher than the rotation speed of the right drive wheel 261. Conversely, the mobile robot 20 can make a left turn by making the rotation speed of the right drive wheel 261 higher than the rotation speed of the left drive wheel 261. That is, the mobile robot 20 can travel straight, pivot, turn right or left, etc. in any direction by controlling the rotation directions and the rotation speeds of the two drive wheels 261.

In the mobile robot 20, the display unit 27 and an operation interface 281 are provided on the upper surface of the main body portion 290. The operation interface 281 is displayed on the display unit 27. When the user touches the operation interface 281 displayed on the display unit 27, the operation reception unit 28 can receive an instruction input from the user. An emergency stop button 282 is provided on the upper surface of the display unit 27. The emergency stop button 282 and the operation interface 281 function as the operation reception unit 28.

The display unit 27 is, for example, a liquid crystal panel that displays a character's face as an illustration or presents information on the mobile robot 20 in text or with an icon. By displaying the character's face on the display unit 27, it is possible to give surrounding observers an impression that the display unit 27 is a pseudo face portion. It is also possible to use the display unit 27 or the like installed in the mobile robot 20 as the user terminal 400.

The cameras 25 are installed on the front surface of the main body portion 290. Two cameras 25 function as stereo cameras. That is, the two cameras 25 having the same angle of view are provided horizontally away from each other. An image captured by each camera 25 is output as image data. It is possible to calculate a distance from a subject and the size of the subject based on the pieces of image data from the two cameras 25. The arithmetic processing unit 21 can detect a person, an obstacle, or the like at a position ahead in the moving direction by analyzing the images from the cameras 25. When there are persons or obstacles ahead in the traveling direction, the mobile robot 20 moves along a route around the persons or obstacles. The pieces of image data from the cameras 25 are transmitted to the host management device 10.

The mobile robot 20 recognizes the peripheral objects and identifies the position of the mobile robot 20 by analyzing the pieces of image data output by the cameras 25 and detection signals output by the front-rear distance sensors 241 and the right-left distance sensors 242. The cameras 25 image a view ahead of the mobile robot 20 in the traveling direction. As shown in FIG. 3, the mobile robot 20 recognizes, as its forward side, the side where the cameras 25 are installed. That is, during normal movement, the traveling direction is the forward direction of the mobile robot 20 as shown by the arrow.

Figure 4:
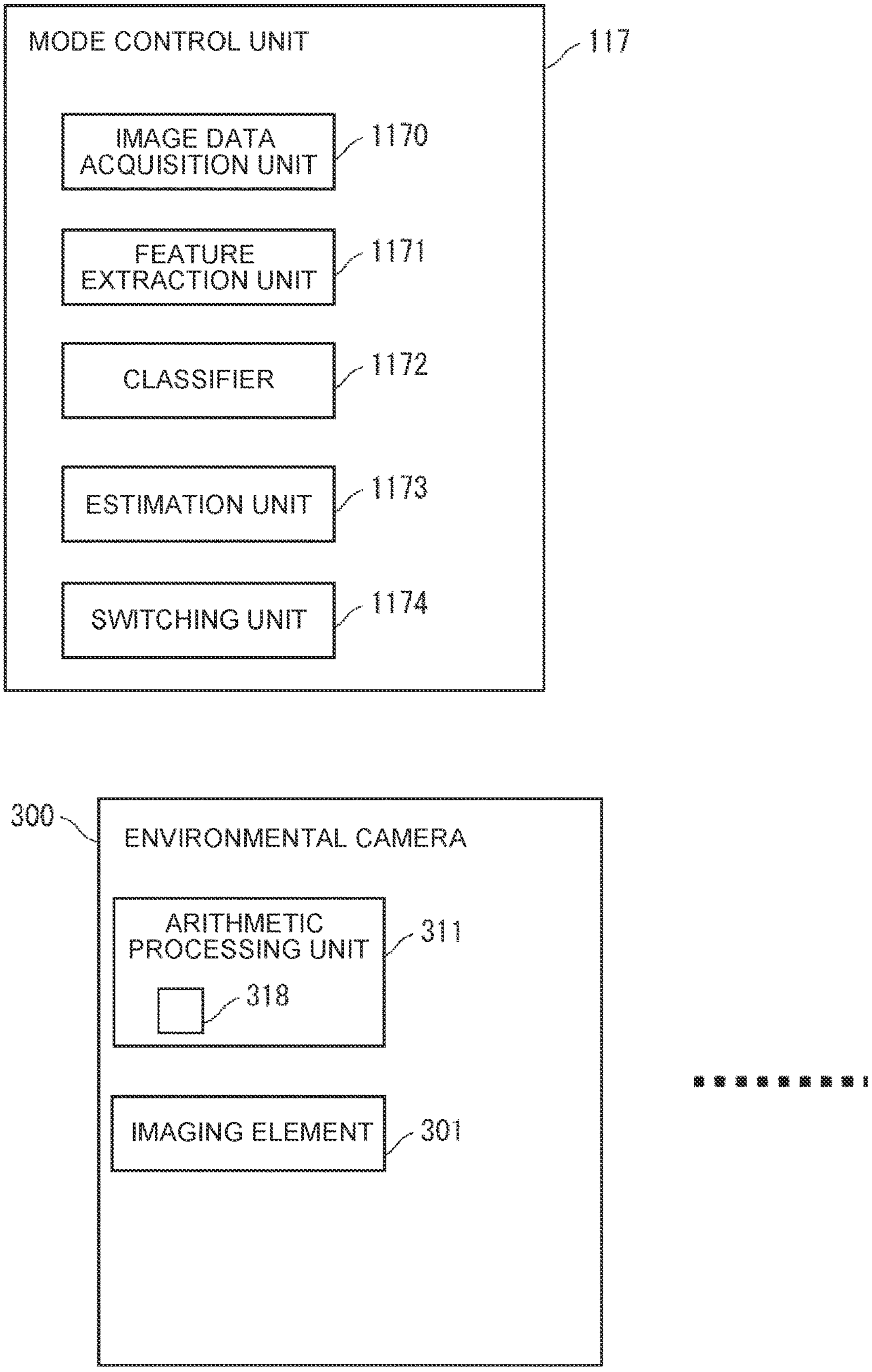
FIG. 4 is a control block diagram showing a control system for mode control.

Next, a mode control process will be described with reference to FIG. 4. The process for mode control will be described as being performed by the host management device 10. Therefore, FIG. 4 is mainly a block diagram showing a control system of the mode control unit 117. The mode control unit 217 of the mobile robot 20 may perform at least a part of the process of the mode control unit 117. That is, the mode control unit 217 and the mode control unit 117 may cooperate to perform the mode control process. Alternatively, the mode control unit 217 may perform the mode control process. Alternatively, the environmental camera 300 may execute at least a part of the process for mode control.

The mode control unit 117 includes an image data acquisition unit 1170, a feature extraction unit 1171, a classifier 1172, an estimation unit 1173, and a switching unit 1174. The environmental camera 300 includes an imaging element 301 and an arithmetic processing unit 311. The imaging element 301 captures an image to monitor the inside of the facility. The arithmetic processing unit 311 includes a graphics processing unit (GPU) 318 that performs image processing or the like on an image captured by the imaging element 301.

The image data acquisition unit 1170 acquires image data of an image captured by the environmental camera 300. The image data may be data on the image captured by the environmental camera 300, or data obtained by processing the captured image data. For example, the image data may be feature amount data extracted from the captured image data. Information such as an imaging time and an imaging location may be added to the image data. The image data acquisition unit 1170 may acquire not only the image data from the environmental camera 300 but also image data from the camera 25 of the mobile robot 20. That is, the image data acquisition unit 1170 may acquire image data based on an image captured by the camera 25 provided in the mobile robot 20. The image data acquisition unit 1170 may acquire pieces of image data from a plurality of environmental cameras 300.

The feature extraction unit 1171 extracts a feature of a person in a captured image. More specifically, the feature extraction unit 1171 detects a person in image data by performing image processing on the image data. Then, the feature extraction unit 1171 extracts a feature of the person in the image data. The arithmetic processing unit 311 provided in the environmental camera 300 may perform at least a part of the process for extracting the feature amount. As means for detecting that a person is included in image data, various technologies such as machine learning including a feature amount in Histograms of Oriented Gradients (HOG) and convolution processing are known to those skilled in the art. Therefore, detailed description thereof will be omitted here.

The feature extraction unit 1171 detects a color of clothing of the detected person. More specifically, for example, the feature extraction unit 1171 calculates the ratio of the area of a specific color from the clothing of the detected person. Alternatively, the feature extraction unit 1171 detects the color of the clothing in a specific part from the clothing of the detected person. In this way, the feature extraction unit 1171 extracts a characteristic portion of the clothing of the staff member.

The feature extraction unit 1171 may extract, as the feature, a characteristic shape of the clothing of the staff member or a characteristic wearing item. The feature extraction unit 1171 may extract a feature in a face image. That is, the feature extraction unit 1171 may extract a feature for face recognition. The feature extraction unit 1171 supplies information on the extracted feature to the classifier 1172.

The classifier 1172 classifies the person into the preset first or second group based on the feature extraction result. For example, the classifier 1172 classifies the person from the feature information received from the feature extraction unit 1171 and the staff information 128 stored in the storage unit 12. The classifier 1172 supplies a classification result to the estimation unit 1173. The classifier 1172 classifies the staff members into the first group, and persons other than the staff members into the second group. The classifier 1172 supplies the classification result to the estimation unit 1173 and the switching unit 1174.

The estimation unit 1173 estimates a moving speed of the person. For example, the estimation unit 1173 identifies the position of the person in each frame of the environmental camera 300. For example, a position (coordinates) and an imaging direction of the environmental camera 300 are preregistered in the floor map 121. Therefore, the estimation unit 1173 can identify the position of the person on the floor map 121 based on the image data. To improve the position accuracy, the environmental camera 300 may be a stereo camera. Alternatively, the plurality of environmental cameras 300 may be used to identify the position of the person. Alternatively, the distance sensor group 24 provided in the mobile robot 20 may be used to identify the position of the person.

The estimation unit 1173 can estimate the moving speed of the person from a change in the position of the person. The estimation unit 1173 estimates a moving speed of a person belonging to the second group. The estimation unit 1173 supplies an estimation result to the switching unit 1174. The estimation unit 1173 may estimate a moving direction of the person.

The switching unit 1174 switches, based on the estimated moving speed, the high-load mode for performing a high-load process and the low-load mode for performing a low-load process. Specifically, the switching unit 1174 sets the high-load mode when the person belonging to the second group is moving at a speed higher than the threshold speed. The switching unit 1174 sets the low-load mode in an area where the person belonging to the second group is moving at a speed lower than the threshold speed. The switching unit 1174 sets the low-load mode in an area without the person belonging to the second group. The switching unit 1174 sets the low-load mode in an area with no person. The switching unit 1174 outputs a signal for switching the mode to the edge device. Examples of the edge device include one or more of the environmental cameras 300, the mobile robots 20, the communication units 610, and the user terminals 400.

FIG. 5 shows an example of the staff information 128. FIG. 5 is a table showing the example of the staff information 128. The staff information 128 is information for classifying the staff members and the non-staff persons into corresponding groups based on their types. The left column shows "category" of staff. Items in the staff category are "non-staff", "pharmacist", and "nurse" from the top. Items other than the illustrated items may be included. On the right side of the staff category, columns "clothing color", "group classification", "speed", and "mode" are shown in this order.

Clothing colors (color tones) associated with the respective items in the staff category will be described below. The color of clothing associated with "non-staff" is "unidentified". That is, when the feature extraction unit 1171 detects a person from image data and the color of clothing of the detected person is not included in preset colors, the feature extraction unit 1171 determines the detected person as "non-staff". According to the staff information 128, the group classification associated with "non-staff" is the second group.

The clothing colors are associated with the categories. For example, it is assumed that colors of staff uniforms are determined for the respective categories. In this case, the colors of the uniforms are different depending on the categories. Therefore, the classifier 1172 can identify the category from the clothing color. Staff members in one category may wear uniforms of different colors. For example, the nurse may wear a white uniform (white coat) or a pink uniform. Alternatively, staff members in a plurality of categories may wear uniforms of a common color. For example, the nurse and the pharmacist may wear white uniforms. A clothing shape, a cap, or the like may be the feature instead of the clothing color. The classifier 1172 identifies a category that matches the feature of the person in the image. When the image includes two or more persons, the classifier 1172 identifies categories of the respective persons.

Based on the clothing color, the classifier 1172 can easily and appropriately determine whether the person is the staff member. For example, even if a new staff member is added, it is possible to determine whether the person is the staff member without using information on the staff member. Alternatively, the classifier 1172 may classify the person as the staff member or the non-staff person based on whether the person has a name tag, an ID card, an entry card, or the like. For example, the classifier 1172 classifies, as the staff member, the person with the name tag attached to a predetermined portion of clothing. Alternatively, the classifier 1172 classifies, as the staff member, a person with the ID or entry card hung from the neck in a card holder or the like.

The classifier 1172 may perform the classification based on the feature of the face image. For example, the staff information 128 may prestore face images of the staff members or their feature amounts. When the feature of a human face in the image captured by the environmental camera 300 can be extracted, determination can be made as to whether the person is the staff member by comparing the feature amounts of the face images. When the staff categories are preregistered, the staff member can be identified from the feature amount of the face image. The classifier 1172 may perform the classification by combining a plurality of features.

In this way, the classifier 1172 determines whether the person in the image is the staff member. The classifier 1172 classifies the person who is the staff member into the first group. The classifier 1172 classifies the person who is the non-staff person into the second group. That is, the classifier 1172 classifies a person other than the staff member into the second group. In other words, the classifier 1172 classifies a person who cannot be identified as the staff member into the second group. Although the staff members are preferably preregistered, a new staff member may be classified based on the clothing color.

The classifier 1172 may be a machine learning model generated by machine learning. In this case, images captured for the respective staff categories can be used for the machine learning as teacher data. That is, a machine learning model with high classification accuracy can be constructed by performing supervised learning using, as teacher data, image data with a staff category as a correct answer label. That is, a captured image of the staff member wearing a predetermined uniform can be used as learning data.

The machine learning model may perform the feature extraction and classification processes. In this case, the machine learning model outputs a classification result by inputting an image including a person into the machine learning model. Machine learning models associated with features to be classified may be used. For example, a machine learning model for classification by clothing colors and a machine learning model for classification by feature amounts of face images may be used independently. When any one of the machine learning models recognizes a person as the staff member, the classifier 1172 determines that the person belongs to the first group. When the person cannot be identified as the staff member, the classifier 1172 determines that the person belongs to the second group.

Mode Information

FIG. 6 is a table showing an example of the mode information 129. FIG. 6 shows differences in processes between the low-load mode and the high-load mode. In FIG. 6, six items that are "classifier", "camera pixels", "frame rate", "camera sleep", "number of cores used in graphics processing unit (GPU)", and "upper limit of GPU usage" are shown as items to be used in the mode control. The switching unit 1174 can switch one or more items shown in FIG. 6 depending on the mode.

As shown in the item "classifier", the switching unit 1174 switches the machine learning models of the classifier 1172. The classifier 1172 includes machine learning models with multiple layers of deep neural network (DNN). In the low-load mode, the classifier 1172 performs the classification process by using a machine learning model with a small number of layers. As a result, the processing load can be reduced.

In the high-load mode, the classifier 1172 performs the classification process by using a machine learning model with a large number of layers. As a result, the classification accuracy can be improved in the high-load mode. The machine learning model with a large number of layers has a higher calculation load than the machine learning model with a small number of layers. Therefore, the calculation load can be changed such that the switching unit 1174 switches the network layers of the machine learning model of the classifier 1172 depending on the mode.

The machine learning model with a small number of layers may have a higher probability of classification into the second group than the machine learning model with a large number of layers. Therefore, when determination is made, from the result output from the machine learning model with a small number of layers, that the user is the non-staff person, the switching unit 1174 switches the low-load mode to the high-load mode. The switching unit 1174 can appropriately switch the low-load mode to the high-load mode. The edge device such as the environmental camera 300 or the mobile robot 200 may include the machine learning model with a small number of network layers. In this case, the edge device alone can perform the processes such as classification and switching. The host management device 10 may include the machine learning model with a large number of network layers.

As shown in the item "camera pixels", the switching unit 1174 switches the number of pixels of the environmental camera 300. In the low-load mode, the environmental camera 300 outputs a captured image with a small number of pixels. In the high-load mode, the environmental camera 300 outputs a captured image with a large number of pixels. That is, the switching unit 1174 outputs a control signal for switching the number of pixels of the captured image from the environmental camera 300 depending on the mode. When the captured image with a large number of pixels is used, the processing load of the processor or the like is higher than that when the captured image with a small number of pixels is used. To switch the number of pixels of the environmental camera 300, the environmental camera 300 may include a plurality of imaging elements having different numbers of pixels. Alternatively, the captured images with different numbers of pixels may be output by using a program or the like installed in the environmental camera 300. For example, the GPU 318 or the like can generate the captured image with a small number of pixels by thinning out image data of the captured image with a large number of pixels.

In the low-load mode, the classifier 1172 classifies the user based on the captured image with a small number of pixels. In the low-load mode, the estimation unit 1173 estimates the moving speed of the user based on the captured image with a small number of pixels. As a result, the processing load can be reduced. In the high-load mode, the classifier 1172 classifies the user based on the captured image with a large number of pixels. In the high-load mode, the estimation unit 1173 estimates the moving speed of the user based on the captured image with a large number of pixels. As a result, the classification accuracy and the estimation accuracy can be improved in the high-load mode. Therefore, the non-staff person moving at a high speed can be monitored effectively, and thus appropriate control can be performed.

As shown in the item "frame rate", the switching unit 1174 switches the frame rate of the environmental camera 300. In the low-load mode, the environmental camera 300 captures an image at a low frame rate. In the high-load mode, the environmental camera 300 captures an image at a high frame rate. That is, the switching unit 1174 outputs a control signal for switching the frame rate of the captured image from the environmental camera 300 depending on the mode. Since the image is captured at the high frame rate, the processing load of the processor or the like is higher than that when the frame rate is low.

In the high-load mode, the classifier 1172 classifies the user based on the captured image at the high frame rate. In the low-load mode, the estimation unit 1173 estimates the moving speed of the user based on the captured image at the low frame rate. As a result, the processing load can be reduced. In the high-load mode, the estimation unit 1173 estimates the moving speed of the user based on the captured image at the high frame rate. As a result, the classification accuracy and the estimation accuracy can be improved in the high-load mode. Therefore, the non-staff person moving at a high speed can be monitored effectively, and thus appropriate control can be performed.

As shown in the item "camera sleep", the switching unit 1174 switches ON and OFF of the sleep of the environmental camera 300. In the low-load mode, the environmental camera 300 is set to a sleep state. In the high-load mode, the environmental camera 300 operates without sleeping. That is, the switching unit 1174 outputs a control signal for switching the ON and OFF of the sleep of the environmental camera 300 depending on the mode. Since the environmental camera 300 sleeps in the low-load mode, the processing load can be reduced.

As shown in the item "number of cores used in GPU", the switching unit 1174 switches the number of cores used in the GPU 318. The GPU 318 performs image processing on the image captured by the environmental camera. For example, as shown in FIG. 4, the environmental camera 300 functions as an edge device including the arithmetic processing unit 311. The arithmetic processing unit 311 includes the GPU 318 for performing image processing. The GPU 318 includes a plurality of cores capable of parallel processing.

In the low-load mode, the GPU 318 of the environmental camera 300 operates with a small number of cores. As a result, the arithmetic processing load can be reduced. In the high-load mode, the GPU 318 of the environmental camera 300 operates with a large number of cores. That is, the switching unit 1174 outputs a control signal for switching the number of cores of the GPU 318 depending on the mode. With the large number of cores, the processing load of the environmental camera 300 that is the edge device increases.

In the low-load mode, the user classification process and the moving speed estimation process are performed by the GPU 318 with the small number of cores. In the high-load mode, the user classification process and the moving speed estimation process are performed by the GPU 318 with the large number of cores. As a result, the classification accuracy and the estimation accuracy can be improved in the high-load mode. Therefore, the non-staff person moving at a high speed can be monitored effectively, and thus appropriate control can be performed.

As shown in the item "upper limit of GPU usage", the switching unit 1174 switches the upper limit of the GPU usage. The GPU 318 performs image processing on the image captured by the environmental camera. In the low-load mode, the GPU 318 of the environmental camera 300 operates at a low usage upper limit value. As a result, the arithmetic processing load can be reduced. In the high-load mode, the GPU of the environmental camera 300 operates at a high usage upper limit value. That is, the switching unit 1174 outputs a control signal for switching the upper limit value of the usage of the GPU 318 depending on the mode. At the high upper limit of the usage, the processing load of the environmental camera 300 that is the edge device increases.

In the low-load mode, the GPU 318 performs the user classification process and the moving speed estimation process at the low usage. In the high-load mode, the GPU 318 performs the user classification process and the moving speed estimation process at the high usage. As a result, the classification accuracy and the estimation accuracy can be improved in the high-load mode. Therefore, the non-staff person moving at a high speed can be monitored effectively, and thus appropriate control can be performed.

The switching unit 1174 switches at least one of the items described above. Thus, appropriate control can be performed depending on the environment. The switching unit 1174 may switch two or more items. The items to be switched by the switching unit 1174 are not limited to the items illustrated in FIG. 6, and other items may be switched. Specifically, in the high-load mode, monitoring may be performed by using a larger number of environmental cameras 300. That is, in the low-load mode, some of the environmental cameras 300 or the like may be put to sleep. The switching unit 1174 can change the processing load by switching various items depending on the mode. Since the host management device 10 can flexibly change the processing load depending on situations, the power consumption can be reduced.

When the classification and the estimation are performed in the low-load processing, the accuracy decreases. Therefore, the processing may be performed so that the mode can be switched to the high-load mode more easily. For example, the probability of classification into the second group in the low-load mode may be set higher than the probability of classification into the second group in the high-load mode.

In the high-load mode, the host management device 10 that is the server may collect images from a plurality of environmental cameras 300. The host management device 10 that is the server may collect images from the cameras 25 installed on one or more mobile robots 20. Then, the processing may be performed on the images collected from the cameras. In the low-load mode, the processing may be performed by the edge device such as the environmental camera 300 alone. Thus, the control can be performed with a more appropriate processing load.

Figure 7:
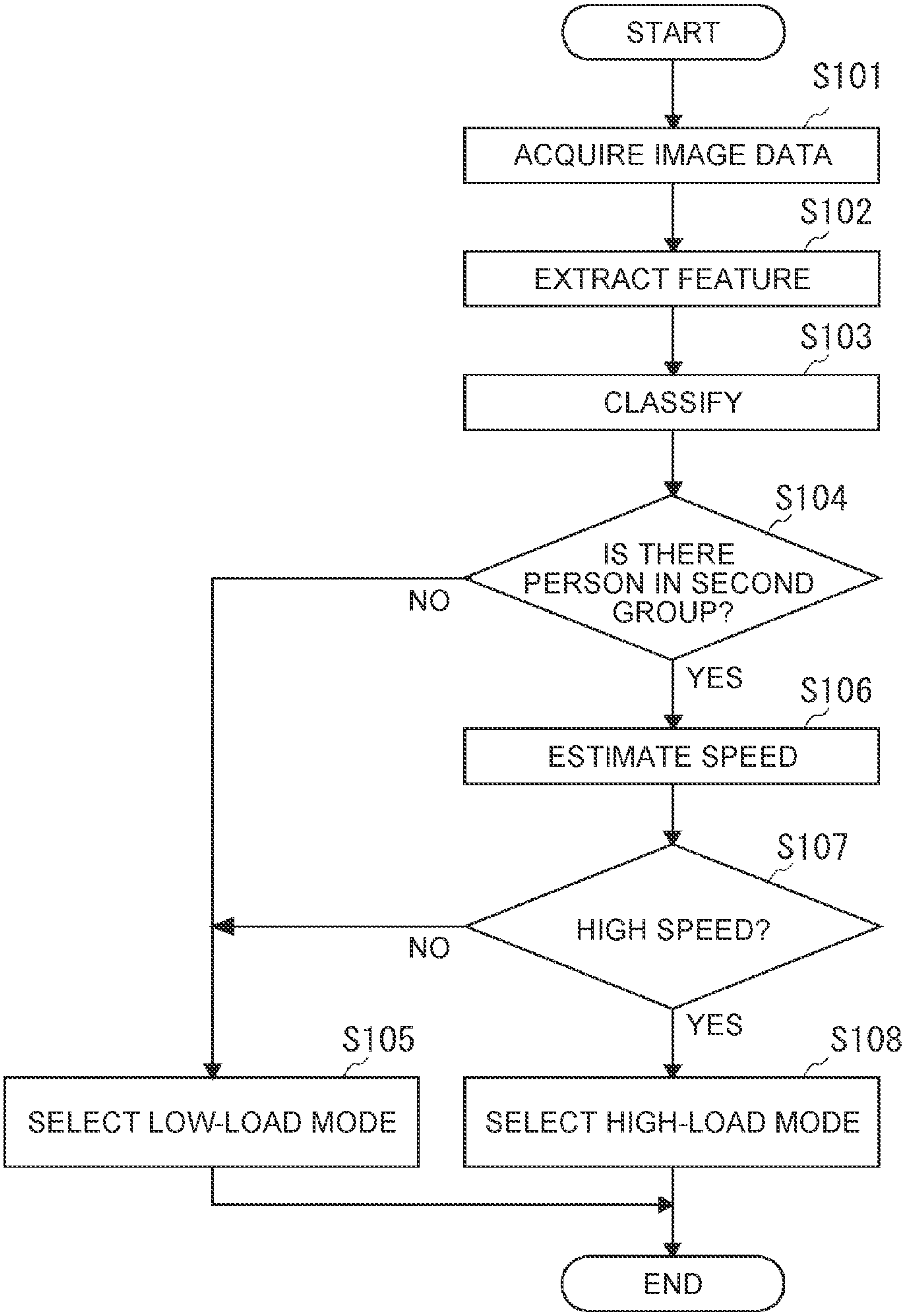
FIG. 7 is a flowchart showing a control method according to the embodiment.

FIG. 7 is a flowchart showing a control method according to the present embodiment. First, the image data acquisition unit 1170 acquires image data from the environmental camera 300 (S101). That is, when the environmental camera 300 images the monitoring area, the captured image is transmitted to the host management device 10. The image data may be a moving image or a still image. The image data may be obtained by subjecting the captured image to various processes.

Next, the feature extraction unit 1171 extracts a feature of a person in the captured image (S102). The feature extraction unit 1171 detects a person in the captured image and extracts a feature for each person. For example, the feature extraction unit 1171 extracts a color of clothing of the person as the feature. The feature extraction unit 1171 may extract not only the clothing color but also a feature amount for face recognition or a clothing shape. The feature extraction unit 1171 may extract, as the feature, the presence or absence of a nurse cap, a name tag, or an ID card.

The classifier 1172 classifies the person in the captured image into the first group or the second group based on the feature of the person (S103). The classifier 1172 refers to the staff information and determines whether each person belongs to the first group based on the feature of the person. Specifically, the classifier 1172 determines that the person belongs to the first group when the clothing color matches a color of a preset uniform. As a result, every person in the captured image is classified into the first group or the second group. The classifier 1172 may perform the classification by using any other feature as well as the clothing color feature.

The classifier 1172 determines whether a person in the second group is present in the monitoring area (S104). When the person in the second group is not present (NO in S104), the switching unit 1174 selects the low-load mode (S105). The switching unit 1174 transmits a control signal for setting the low-load mode to the edge device such as the environmental camera 300 or the mobile robot 20. As a result, the host management device 10 performs monitoring with a low load. That is, there is no non-staff person who may perform an unpredictable action. Therefore, the person is unlikely to come into contact with the mobile robot 20. Therefore, the mobile robot 20 can move appropriately even when the monitoring is performed with the low processing load. By reducing the processing load, the power consumption can be reduced.

When the person in the second group is present (YES in S104), the estimation unit 1173 estimates a moving speed of the person in the second group (S106). The estimation unit 1173 determines whether the person in the second group is moving at a high speed (S107). That is, the estimation unit 1173 compares the moving speed of the person in the second group and the threshold speed. When the moving speed is equal to or higher than the threshold speed, the estimation unit 1173 determines that the person is moving at a high speed. When the moving speed is lower than the threshold speed, the estimation unit 1173 determines that the person is not moving at a high speed.

When the person in the second group is not moving at a high speed (NO in S107), the switching unit 1174 selects the low-load mode (S105). The switching unit 1174 transmits a control signal for setting the low-load mode to the edge device such as the environmental camera 300 or the mobile robot 20. As a result, the host management device 10 performs monitoring with a low load. That is, the non-staff person who may perform an unpredictable action is moving at a low speed. Therefore, the person is unlikely to come into contact with the mobile robot 20. The mobile robot 20 can move appropriately even when the monitoring is performed with the low processing load. By reducing the processing load, the power consumption can be reduced.

When the person in the second group is moving at a high speed (YES in S107), the switching unit 1174 selects the high-load mode (S108). The switching unit 1174 transmits a control signal for setting the high-load mode to the edge device such as the environmental camera 300 or the mobile robot 20. Thus, the monitoring can be performed with a high load. That is, the non-staff person who may perform an unpredictable action is moving at a high speed. Therefore, the host management device 10 monitors the monitoring area with a high processing load. As a result, the mobile robot 20 can avoid contact with the non-staff person in advance. The mobile robot 20 can be controlled appropriately. When there is even one person in the second group who is moving at a high speed, the switching unit 1174 selects the high-load mode.

In the above description, the switching unit 1174 switches the mode in two stages that are the high-load mode and the low-load mode depending on the moving speed, but the mode may be switched in three or more stages. For example, a medium-load mode may be provided between the high-load mode and the low-load mode. The host management device 10 can switch the monitoring control more finely depending on the moving speed, the number of non-staff persons, the distance between the mobile robot 20 and the non-staff person, and the like. Thus, appropriate control can be performed.

Figure 8:
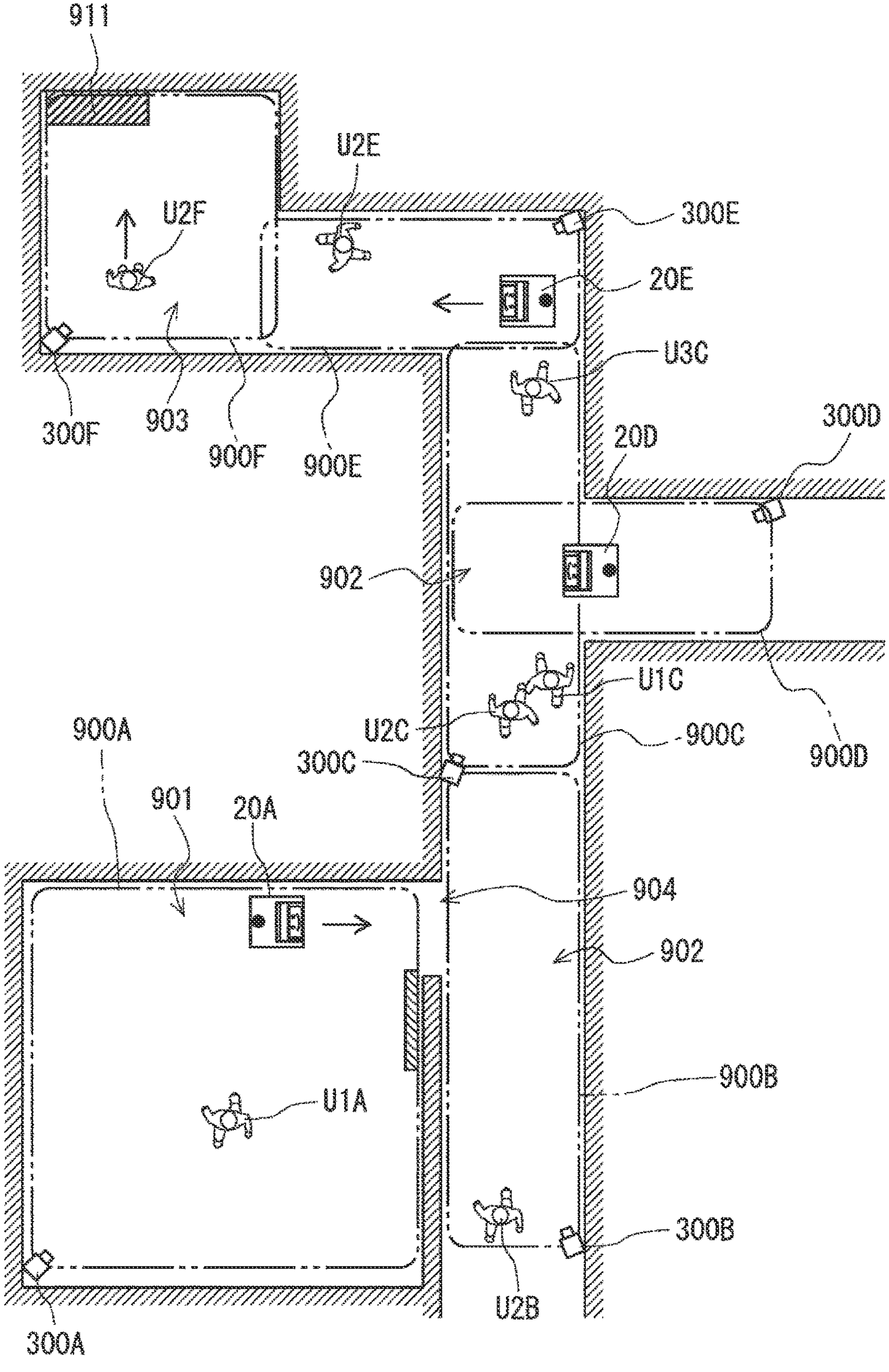
FIG. 8 is a diagram illustrating an example of the mode control.

FIG. 8 is a diagram illustrating a specific example of the mode switching. FIG. 8 is a schematic diagram of the floor where the mobile robots 20 move when viewed from the top. The facility has a room 901, a room 903, and a passage 902. The passage 902 connects the room 901 and the room 903. In FIG. 8, six environmental cameras 300 are identified as environmental cameras 300A to 300F. The environmental cameras 300A to 300F are installed at different positions and in different directions. The environmental cameras 300A to 300F are imaging different areas. The positions, imaging directions, imaging ranges, and the like of the environmental cameras 300A to 300F may be preregistered in the floor map 121.

The areas allocated to the environmental cameras 300A to 300F are defined as monitoring areas 900A to 900F, respectively. For example, the environmental camera 300A images the monitoring area 900A, and the environmental camera 300B images the monitoring area 900B. Similarly, the environmental cameras 300C, 300D, 300E, and 300F image the monitoring areas 900C, 900D, 900E, and 900F, respectively. In this way, the plurality of environmental cameras 300A to 300F is installed in the target facility. The facility is divided into the plurality of monitoring areas. Information on the monitoring areas may be preregistered in the floor map 121.

For simplification of the description, it is assumed that each of the environmental cameras 300A to 300F monitors one monitoring area, but one environmental camera 300 may monitor a plurality of monitoring areas. Alternatively, a plurality of environmental cameras 300 may monitor one monitoring area. That is, the imaging ranges of two or more environmental cameras may overlap each other.

Example 1

In Example 1, the monitoring area 900A monitored by the environmental camera 300A will be described. The monitoring area 900A is associated with the room 901 in the facility. A mobile robot 20A and a user U1A who is the staff member are present in the monitoring area 900A. The classifier 1172 classifies the user U1A into the first group. The switching unit 1174 switches the mode in the monitoring area 900A to the low-load mode. The host management device 10 monitors the monitoring area 900A by low-load processing. For example, the environmental camera 300A outputs a captured image with a small number of pixels. The switching unit 1174 may output a control signal for setting any other item in the low-load mode. The switching unit 1174 may output a control signal for setting the mode of the mobile robot 20A to the low-load mode.

Example 2

In Example 2, the monitoring area 900E monitored by the environmental camera 300E will be described. The monitoring area 900E is associated with the passage 902 in the facility. Specifically, the monitoring area 900E is the passage 902 connected to the monitoring area 900F. A user U2E who is the non-staff person and a mobile robot 20E are present in the monitoring area 900E. The classifier 1172 classifies the user U2E into the second group. The estimation unit 1173 estimates that the moving speed of the user U2E is higher than the threshold speed.

The switching unit 1174 switches the mode in the monitoring area 900E to the high-load mode. The host management device 10 monitors the monitoring area 900E by high-load processing. For example, the environmental camera 300E outputs a captured image at a high frame rate. The switching unit 1174 may output a control signal for setting any other item in the high-load mode. The switching unit 1174 may output a control signal for setting the mode of the mobile robot 20E to the high-load mode.

Example 3

In Example 3, the monitoring area 900D monitored by the environmental camera 300D will be described. The monitoring area 900D is associated with the passage 902 in the facility. No person is present in the monitoring area 900D. Therefore, the host management device 10 switches the mode in the monitoring area 900D to the low-load mode. Thus, the host management device 10 monitors the monitoring area 900D by low-load processing. The environmental camera 300D outputs a captured image with a small number of pixels. The switching unit 1174 may output a control signal for setting any other item in the low-load mode.

Example 4

In Example 4, the monitoring area 900F monitored by the environmental camera 300F will be described. The monitoring area 900F is associated with the room 903 in the facility. A user U2F is present in the monitoring area 900F. In Example 4, the estimation unit 1173 estimates a moving direction of the user U2F. The monitoring area 900F includes a restricted area 911 that prohibits entry of the non-staff person. It is assumed that the user U2F is moving in a direction toward the restricted area 911.

When determination is made that the user U2F is moving toward the restricted area 911, the switching unit 1174 switches the mode in the monitoring area 900F to the high-load mode. The host management device 10 monitors the monitoring area 900F by high-load processing. For example, the environmental camera 300F outputs a captured image at a high frame rate and with a large number of pixels. The switching unit 1174 may output a control signal for setting any other item in the high-load mode. When the non-staff person changes the moving direction and moves away from the restricted area 911, the monitoring may be performed in the low-load mode. When the non-staff person has moved away from the restricted area 911 at a predetermined distance or longer, the monitoring may be performed in the low-load mode.

The restricted area 911 includes a chemical shelf, an equipment shelf, and the like. That is, the chemical shelf, the equipment shelf, and the surrounding area are set as the restricted area 911. When the non-staff person is approaching the shelves, the monitoring is performed more closely. The switching unit 1174 may switch the mode depending on the position of the non-staff person on the floor map 121. When the non-staff person approaches the shelves at the predetermined distance or shorter, the host management device 10, the environmental camera 300, or the user terminal 400 may notify the staff member. For example, the user terminal 400 can notify the staff member by issuing an alarm sound, outputting an alert message, or blinking an alert lamp. Thus, it is possible to prevent the non-staff person from coming into contact with equipment or chemicals.

As described above, in Example 4, the switching unit 1174 switches the mode based on the moving direction of the person. The switching unit 1174 may switch the mode regardless of the moving speed. That is, the switching unit 1174 may switch the mode to the high-load mode even when the moving speed of the user U2F is equal to or lower than the threshold speed. In other words, the switching unit 1174 may switch the mode to the low-load mode when the moving speed is equal to or higher than the threshold speed and the user is moving away from the restricted area.

Alternatively, when the moving speed is equal to or higher than the threshold speed, the mode may be switched depending on the moving direction. That is, the switching unit 1174 may set the low-load mode when the moving speed is lower than the threshold speed and the user U2F is moving toward the restricted area. The switching unit 1174 may switch the mode based on the position and the moving direction of the person. That is, the mode may be switched depending on the moving direction only when the non-staff person is near the restricted area 911. Thus, the monitoring area can be monitored more appropriately.

Example 5

In Example 5, the monitoring area 900C monitored by the environmental camera 300C will be described. The monitoring area 900C is associated with the passage 902 in the facility. Specifically, the monitoring area 900C includes a part of the passage 902 between the room 901 and the room 903. A user U1C who is the staff member and users U2C and U3C who are the non-staff persons are present in the monitoring area 900C. The user U2C and the user U3C are patients who have suffered injuries to their legs or the like and have difficulty in walking. The user U1C is a walking assistant who assists the walking of the user U2C. A mobile robot 20D is moving around the user U2C. The mobile robot 20E is moving around the user U3C.

In this example, the host management device 10 determines whether the person in the captured image has difficulty in walking. For example, when the person in the captured image uses an assisting tool such as a cane, an intravenous instillation stand, or a wheelchair, the host management device 10 determines that the person has difficulty in walking. Then, the host management device 10 determines whether an assistant who assists a walking motion is present near the person having difficulty in walking. The host management device 10 switches the control on the mobile robot 20 depending on the presence or absence of the assistant. Examples of the assistant include a person who supports a walking person having difficulty in walking. For example, the person having difficulty in walking walks while leaning on the assistant. Alternatively, if the person having difficulty in walking is in a wheelchair, the assistant may be a person who pushes the wheelchair. The person having difficulty in walking is the non-staff person, but may be the staff member. The assistant may be the staff member or the non-staff person.

For example, it is assumed that the user U2C having difficulty in walking is present around the mobile robot 20D. The host management device 10 determines whether the assistant is present around the user U2C. The user U1C who is the assistant is present around the user U2C. The host management device 10 determines that the user U2C has the assistant. In this case, a control signal is output so that the mobile robot 20D near the user U2C can move at a high speed. The user U1C who is the walking assistant can assist the walking to move around the mobile robot 20D. Therefore, the mobile robot 20D can move at a high speed. Thus, the transport efficiency can be improved.

It is assumed that the user U3C having difficulty in walking is present around the mobile robot 20E. The host management device 10 determines whether the assistant is present around the user U3C. No assistant is present around the user U3C. Therefore, a control signal is output so that the mobile robot 20E moves at a low speed. That is, it is difficult for the user U3C having difficulty in walking to move around the mobile robot 20E at once. Therefore, the mobile robot 20E moves at a low speed. Thus, the safety can further be increased.

The determination as to whether the person has difficulty in walking and the determination as to whether the person is the assistant can be made based on the captured image or the like. For example, the host management device 10 can determine whether the person has difficulty in walking depending on the presence or absence of the assisting tool in the captured image. Whether the person is the walking assistant can be estimated from the presence or absence of a uniform, a color of the uniform, a distance from the person having difficulty in walking, an attitude to the person having difficulty in walking, or the like. A machine learning model for these determinations may be generated. That is, a machine learning model can be generated by using a large number of captured images as learning data.

In this way, the host management device 10 detects the presence or absence of the person having difficulty in walking based on the captured image. The host management device 10 detects the presence or absence of the assistant based on the captured image. The host management device 10 switches the control on the mobile robot 20 depending on the presence or absence of the person having difficulty in walking and the presence or absence of the assistant. For example, when the person having difficulty in walking and the assistant are present, the mobile robot 20 moves in a high-speed movement mode. When there is no person having difficulty in walking, the mobile robot 20 moves in the high-speed movement mode. When the person having difficulty in walking is present and the walking assistant is not present, the mobile robot 20 moves in a low-speed movement mode.

In the high-speed movement mode, for example, the mobile robot 20 moves at a high upper limit speed. In the low-speed movement mode, for example, the mobile robot 20 moves at a relatively low upper limit speed. In this way, the host management device 10 transmits a control signal for changing the upper limit speed to the mobile robot 20. The control on the mobile robot 20 is switched depending on the presence or absence of the assistant.

The host management device 10 may transmit, to the mobile robot 20, a control signal for changing the distance threshold value for deceleration or stop. For example, in the low-speed movement mode, the mobile robot 20 moves with a large distance threshold value. Therefore, the mobile robot 20 can decelerate or stop early. It is possible to prevent contact with the person having difficulty in walking. In the high-speed movement mode, the mobile robot 20 moves with a small distance threshold value. Therefore, it is possible to prevent the mobile robot 20 from decelerating or stopping. Thus, the mobile robot 20 can move efficiently. When the mobile robot 20 moves based on a cost map, the cost map may be expanded in the low-speed movement mode. That is, when the mobile robot 20 moves while searching for a low-cost route, the control is switched to expand the cost map.

The positions of the user U1C, the user U2C, and the user U3C on the floor map can be identified based on the captured image and the sensor output from the distance sensor group 24. Similarly, the current positions of the mobile robot 20D, the mobile robot 20E, and the like can be identified based on the odometry and the measurement results from the distance sensor group 24.

Example 6

In Example 6, description will be given of a case where the facility is monitored by a plurality of environmental cameras 300. Description will be given of control on the monitoring area 900A in a case where the environmental camera 300A and the environmental camera 300B are used. In this example, the host management device 10 causes some of the environmental cameras 300 to sleep by monitoring the plurality of environmental cameras 300 in conjunction.

The environmental camera 300A is imaging the room 901. The environmental camera 300B is imaging the passage 902 leading to the room 901. Specifically, the environmental camera 300B is imaging the periphery of an entrance 904 of the room 901. Therefore, the host management device 10 can detect entry into and exit from the room 901 based on the image captured by the environmental camera 300B.

Since the user U1A belongs to the first group as described above, it is assumed that the monitoring area 900A is monitored in the low-load mode. In this case, the host management device 10 puts the environmental camera 300A into the sleep mode. As a result, the power consumption can be reduced. The environmental camera 300B is imaging the periphery of the entrance 904. Therefore, the host management device 10 can detect that a person is present near the entrance 904 based on the image captured by the environmental camera 300B. When the host management device 10 detects that the person is present near the entrance 904 based on the image captured by the environmental camera 300B, the sleep mode of the environmental camera 300A is terminated.

Figure 9:
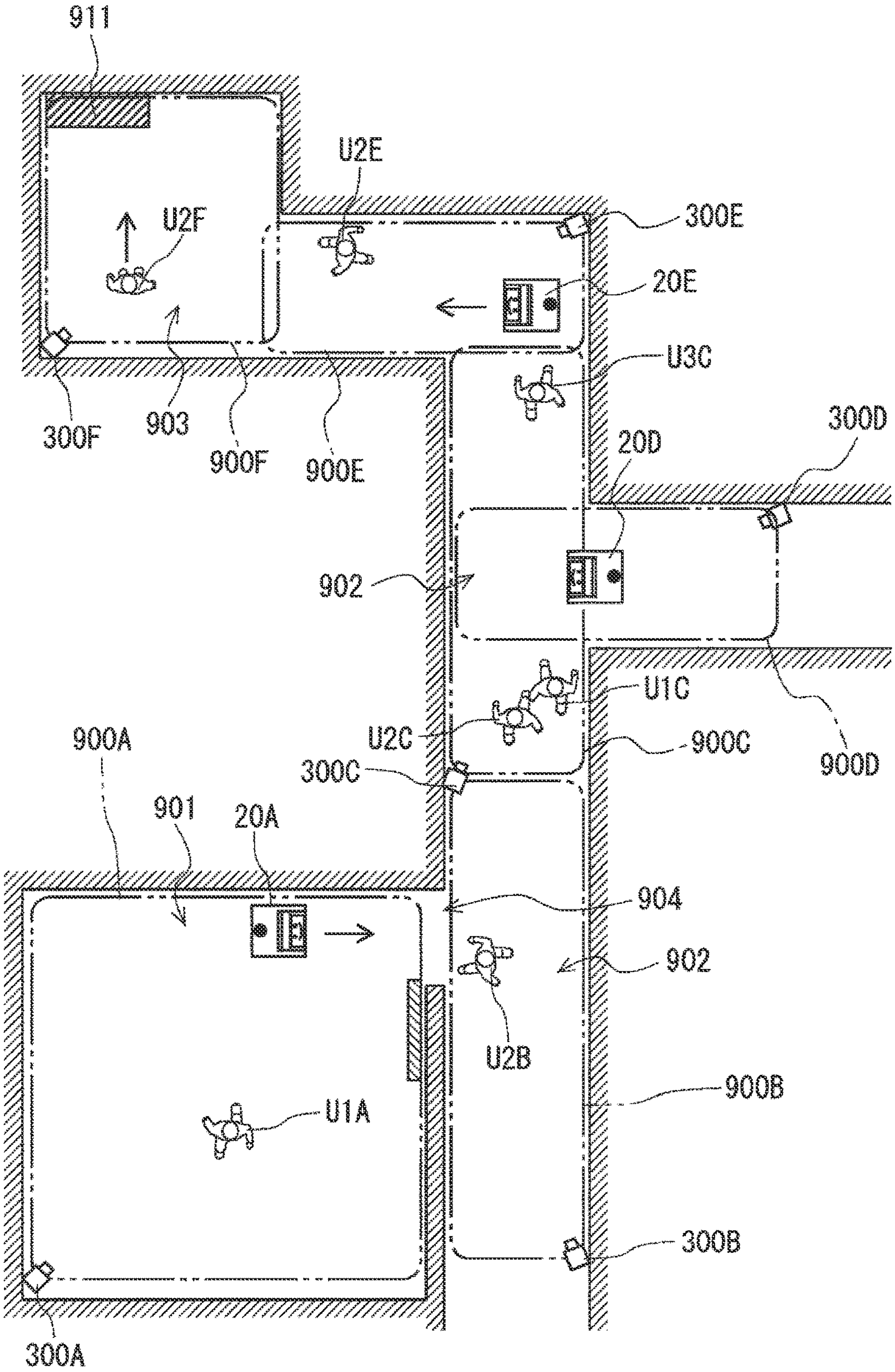
FIG. 9 is a diagram illustrating an example of the mode control.

For example, it is assumed that a user U2B who is the non-staff person is present in the monitoring area 900B as shown in FIG. 8. The host management device 10 estimates a position of the user U2B on the floor map 121 based on the image captured by the environmental camera 300B and detection results from other sensors. The positions of the passage 902 and the entrance 904 are registered in the floor map 121. Therefore, when the user U2B is away from the entrance 904, the host management device 10 monitors the monitoring area 900A in the low-load mode. When the user U2B moves to the entrance 904 as shown in FIG. 9, the host management device 10 monitors the monitoring area 900A in the high-load mode.

In this way, the host management device 10 detects the entry of the person into the monitoring area 900A based on the image captured by the environmental camera 300B. When the person enters the monitoring area 900A, the host management device 10 monitors the monitoring area 900A in the high-load mode. Therefore, the host management device 10 outputs a control signal for terminating the sleep of the environmental camera 300.

The host management device 10 may detect the exit of the person based on the images captured by the environmental cameras 300A and 300B. When the host management device 10 detects that the person exits the monitoring area 900A, the host management device 10 switches the mode in the monitoring area 900A to the low-load mode. Therefore, the environmental camera 300A enters the sleep mode. Thus, the monitoring can be performed with a low load, and the power consumption can be reduced.

Although the host management device 10 has been described as detecting the entry and exit of the person based on the captured image, other information may be used. For example, if an automatic door or a security door is provided, the entry and exit may be detected based on operation of the door.

The control in each of Examples 1 to 6 may be executed solely or two or more types of control may be executed in combination. In other words, it is not necessary to perform all the types of control in Examples 1 to 6.

The control method according to the present embodiment may be performed by the host management device 10 or by the edge device. The environmental camera 300, the mobile robot 20, and the host management device 10 may cooperate to execute the control method. That is, the control system according to the present embodiment may be installed in at least one of the environmental camera 300 and the mobile robot 20. Alternatively, at least a part or all of the control system may be installed in a device other than the mobile robot 20, such as the host management device 10.

The host management device 10 is not limited to the physically single device, and may be distributed in a plurality of devices. That is, the host management device 10 may include a plurality of memories and a plurality of processors.

A part or all of the processing in the host management device 10, the environmental camera 300, the mobile robot 20, and the like described above can be implemented as a computer program. Such a program can be stored and supplied to a computer by using various types of non-transitory computer-readable medium. The non-transitory computer-readable medium (non-transitory storage medium) includes various types of tangible recording medium. Examples of the non-transitory computer-readable medium include magnetic recording media (e.g., flexible disks, magnetic tapes, and hard disk drives), magneto-optical recording media (e.g., magneto-optical disks), a compact disc read-only memory (CD-ROM), a compact disc recordable (CD-R), a compact disc rewritable (CD-R/W), and semiconductor memories (e.g., mask ROM, programmable ROM (PROM), erasable PROM (EPROM), flash ROM, and random access memory (RAM)). The program may also be supplied to the computer by various types of transitory computer-readable medium. Examples of the transitory computer-readable medium include electrical signals, optical signals, and electromagnetic waves. The transitory computer-readable medium can supply the program to the computer via a wired communication path such as an electric wire and an optical fiber, or a wireless communication path.

The present disclosure is not limited to the above embodiment and can be modified as appropriate without departing from the spirit and scope of the disclosure. For example, the above embodiment is directed to the system in which the transport robot autonomously moves in the hospital, but the system can transport a predetermined article as baggage in a hotel, a restaurant, an office building, an event venue, or a complex facility.

What is claimed is:

1. A control system comprising one or more processors configured to:

control a mobile robot to autonomously move in a predetermined facility;

acquire an image of an area in the predetermined facility captured by a camera;

extract a feature of a person in the image;

classify the person into a preset first group or a preset second group based on the feature, wherein a staff member of the predetermined facility is classified into the first group, and a person other than the staff member is classified into the second group;

estimate a moving speed of the person upon classifying that the person belongs to the second group; and switch, based on at least the classification of the person, a mode between a high-load mode for performing a high-load process and a low-load mode for performing a process with a load lower than a load in the high-load mode, wherein the one or more processors are further configured to:

monitor the area in the predetermined facility in the low-load mode when (i) the person belongs to the second group and the moving speed of the person is lower than a threshold speed or (ii) the person belonging to the second group is absent, monitor the area in the predetermined facility in the high-load mode when the person belongs to the second group and the moving speed of the person is higher than the threshold speed, determine whether the person belonging to the second group has difficulty in walking based on whether the person uses an assisting tool, wherein a person using a cane, an intravenous instillation stand, or a wheelchair is determined to be the person having difficulty in walking;

determine whether an assistant who assists a walking motion is present near the person upon determining that the person has difficulty in walking;

switch control on the mobile robot to a high-speed movement mode in a case that the person having difficulty in walking and the assistant are present; and switch control on the mobile robot to a low-speed movement mode in a case that the person having difficulty in walking is present and the assistant is absent, wherein in the high-speed movement mode, the mobile robot moves in the predetermined facility at a first speed, and in the low-speed movement mode, the mobile robot moves in the predetermined facility at a second speed, the first speed being higher than the second speed.

2. The control system according to claim 1, wherein the one or more processors are configured to classify the person into the first group or the second group by using a machine learning model.

3. The control system according to claim 1, wherein the one or more processors are configured to change network layers of the machine learning model for classification depending on the mode.

4. The control system according to claim 1, wherein the one or more processors are configured to switch the mode depending on a moving direction of the person belonging to the second group.

5. The control system according to claim 1, wherein the one or more processors are configured to change, depending on the mode, the number of pixels of the image captured by the camera, a frame rate of the camera, the number of cores used in a graphics processing unit, and an upper limit of usage of the graphics processing unit.

6. The control system according to claim 1, wherein:

in the high-load mode, a server is configured to collect images from a plurality of the cameras and perform the process; and in the low-load mode, an edge device provided in the camera is configured to perform the process alone.

7. The control system according to claim 1, wherein the one or more processors are configured to, in a facility including a plurality of the cameras, cause some of the cameras to sleep in the low-load mode.

8. A control method comprising:

controlling a mobile robot to autonomously move in a predetermined facility;

acquiring an image of an area in the predetermined facility captured by a camera;

extracting a feature of a person in the image;

classifying the person into a preset first group or a preset second group based on the feature, wherein a staff member of the predetermined facility is classified into the first group, and a person other than the staff member is classified into the second group;

estimating a moving speed of the person upon classifying that the person belongs to the second group; and switching, based on at least the classification of the person, a mode between a high-load mode for performing a high-load process and a low-load mode for performing a process with a load lower than a load in the high-load mode, wherein the control method further includes:

monitoring the area in the predetermined facility in the low-load mode when (i) the person belongs to the second group and the moving speed of the person is lower than a threshold speed or (ii) the person belonging to the second group is absent, monitoring the area in the predetermined facility in the high-load mode when the person belongs to the second group and the moving speed of the person is higher than the threshold speed, determining whether the person belonging to the second group has difficulty in walking based on whether the person uses an assisting tool, wherein a person using a cane, an intravenous instillation stand, or a wheelchair is determined to be the person having difficulty in walking;

determining whether an assistant who assists a walking motion is present near the person upon determining that the person has difficulty in walking;

switching control on the mobile robot to a high-speed movement mode in a case that the person having difficulty in walking and the assistant are present; and switching control on the mobile robot to a low-speed movement mode in a case that the person having difficulty in walking is present and the assistant is absent, wherein in the high-speed movement mode, the mobile robot moves in the predetermined facility at a first speed, and in the low-speed movement mode, the mobile robot moves in the predetermined facility at a second speed, the first speed being higher than the second speed.

9. The control method according to claim 8, wherein the person is classified into the first group or the second group by using a machine learning model.

10. The control method according to claim 8, wherein the mode is switched depending on a moving direction of the person belonging to the second group.

11. The control method according to claim 8, wherein the number of pixels of the image captured by the camera, a frame rate of the camera, the number of cores used in a graphics processing unit, and an upper limit of usage of the graphics processing unit are changed depending on the mode.

12. The control method according to claim 8, wherein:

in the high-load mode, a server is configured to collect images from a plurality of the cameras and perform the process; and in the low-load mode, an edge device provided in the camera is configured to perform the process alone.

13. A non-transitory storage medium storing a program that causes a computer to execute a control method, the control method includes:

controlling a mobile robot to autonomously move in a predetermined facility;

acquiring an image of an area in the predetermined facility captured by a camera;

extracting a feature of a person in the image;

classifying the person into a preset first group or a preset second group based on the feature, wherein a staff member of the predetermined facility is classified into the first group, and a person other than the staff member is classified into the second group;

estimating a moving speed of the person upon classifying that the person belongs to the second group; and switching, based on at least the classification of the person, a mode between a high-load mode for performing a high-load process and a low-load mode for performing a process with a load lower than a load in the high-load mode, wherein the control method further includes:

monitoring the area in the predetermined facility in the low-load mode when (i) the person belongs to the second group and the moving speed of the person is lower than a threshold speed or (ii) the person belonging to the second group is absent, monitoring the area in the predetermined facility in the high-load mode when the person belongs to the second group and the moving speed of the person is higher than the threshold speed, determining whether the person belonging to the second group has difficulty in walking based on whether the person uses an assisting tool, wherein a person using a cane, an intravenous instillation stand, or a wheelchair is determined to be the person having difficulty in walking;

determining whether an assistant who assists a walking motion is present near the person upon determining that the person has difficulty in walking;

switching control on the mobile robot to a high-speed movement mode in a case that the person having difficulty in walking and the assistant are present; and switching control on the mobile robot to a low-speed movement mode in a case that the person having difficulty in walking is present and the assistant is absent, wherein in the high-speed movement mode, the mobile robot moves in the predetermined facility at a first speed, and in the low-speed movement mode, the mobile robot moves in the predetermined facility at a second speed, the first speed being higher than the second speed.

14. The non-transitory storage medium storing the program according to claim 13, wherein the control method includes classifying the person into the first group or the second group by using a machine learning model.

15. The non-transitory storage medium storing the program according to claim 14, wherein the control method includes changing network layers of the machine learning model for classification depending on the mode.

16. The non-transitory storage medium storing the program according to claim 13, wherein the control method includes switching the mode depending on a moving direction of the person belonging to the second group.

17. The control system according to claim 1, wherein the one or more processors are configured to detect a color of clothing of the person in extracting the feature of the person in the image.

18. The control system according to claim 17, wherein the one or more processors are configured to calculate a ratio of an area of a specific color from a clothing of the person in extracting the feature of the person in the image.

19. The control system according to claim 1, wherein the one or more processors are configured to classify the person into the first group by identifying a predetermined shape of a clothing or a wearing item of the person.

20. The control system according to claim 1, wherein the predetermined facility includes a restricted area that prohibits entry of the person belonging to the second group, and the one or more processors are further configured to:

determine whether the person belonging to the second group is moving toward the restricted area;

switch the mode to the high-load mode in response to determining that the person belonging to the second group is moving toward the restricted area; and switch the mode to the low-load mode in response to determining that the person belonging to the second group has moved away from the restricted area at a predetermined distance or longer.

* * * * *